United States Patent
Madrigal et al.

(10) Patent No.: US 12,000,929 B2
(45) Date of Patent: Jun. 4, 2024

(54) DETECTING USER PRESENCE

(71) Applicant: Google LLC, Mountain View, CA (US)

(72) Inventors: Octavio Ponce Madrigal, Mountain View, CA (US); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 217 days.

(21) Appl. No.: 17/639,545

(22) PCT Filed: Dec. 23, 2020

(86) PCT No.: PCT/US2020/066935
§ 371 (c)(1),
(2) Date: Mar. 1, 2022

(87) PCT Pub. No.: WO2022/139837
PCT Pub. Date: Jun. 30, 2022

(65) Prior Publication Data
US 2023/0350059 A1    Nov. 2, 2023

(51) Int. Cl.
*G01S 15/04*    (2006.01)
*G01S 5/18*    (2006.01)
*G01S 15/88*    (2006.01)

(52) U.S. Cl.
CPC ............ *G01S 15/04* (2013.01); *G01S 5/18* (2013.01); *G01S 15/88* (2013.01)

(58) Field of Classification Search
CPC ............ G01S 15/04; G01S 5/18; G01S 15/88
(Continued)

(56) References Cited

U.S. PATENT DOCUMENTS 6,985,085 B1 *    1/2006    Brown ................. B66C 15/065
340/685
8,907,929 B2    12/2014    Li et al.
(Continued)

FOREIGN PATENT DOCUMENTS

CN    111405085    7/2020
GB    2558768    7/2018

OTHER PUBLICATIONS

"International Search Report and Written Opinion", Application No. PCT/US2020/066935, Sep. 15, 2021, 12 pages.
(Continued)

*Primary Examiner* — Kerri L McNally
(74) *Attorney, Agent, or Firm* — Colby Nipper PLLC

(57) ABSTRACT

Techniques and apparatuses are described that implement an ultrasonic sensor capable of detecting user presence. This ultrasonic sensor can detect user presence without relying on time-of-flight techniques. In particular, the ultrasonic sensor can determine that a user is present based on the occlusion of at least one receiving transducer (e.g., microphone occlusion), the occlusion of at least one transmitting transducer (e.g., speaker occlusion), or a detected change in an audible noise floor of at least one transducer. In this way, the ultrasonic sensor can continue to detect user presence in situations in which a user occludes one or more transducers of the ultrasonic sensor. The ultrasonic sensor can also control operation of another component within a computing device based on the presence of the user to improve the user experience and/or improve power management.

20 Claims, 14 Drawing Sheets

(58) Field of Classification Search
USPC .............................................................. 367/93
See application file for complete search history.

(56) References Cited

U.S. PATENT DOCUMENTS

| | | | |
|---|---|---|---|
| 2012/0001875 A1* | 1/2012 | Li ........................... | G06F 3/017 |
| | | | 345/177 |
| 2017/0168158 A1 | 6/2017 | Reining | |
| 2018/0062684 A1 | 3/2018 | Kim | |
| 2018/0070858 A1* | 3/2018 | Apostolos .............. | A61B 5/742 |
| 2019/0341955 A1 | 11/2019 | Harper et al. | |
| 2020/0225799 A1* | 7/2020 | Marra ..................... | G06F 3/013 |
| 2020/0267941 A1* | 8/2020 | Seltzer ................. | A01K 15/022 |
| 2020/0292656 A1* | 9/2020 | Lvov ....................... | G01S 11/16 |
| 2020/0370886 A1* | 11/2020 | Chen ....................... | G01S 17/88 |

OTHER PUBLICATIONS

Wang, et al., "Hand Gesture Recognition Based on Active Ultrasonic Sensing of Smartphone: A Survey", Aug. 8, 2019, pp. 111897-111922.

"International Preliminary Report on Patentability", Application No. PCT/US2020/066935, Jun. 13, 2023, 9 pages.

"Foreign Office Action", EP Application No. 20845492.6, Sep. 26, 2023, 8 pages.

* cited by examiner

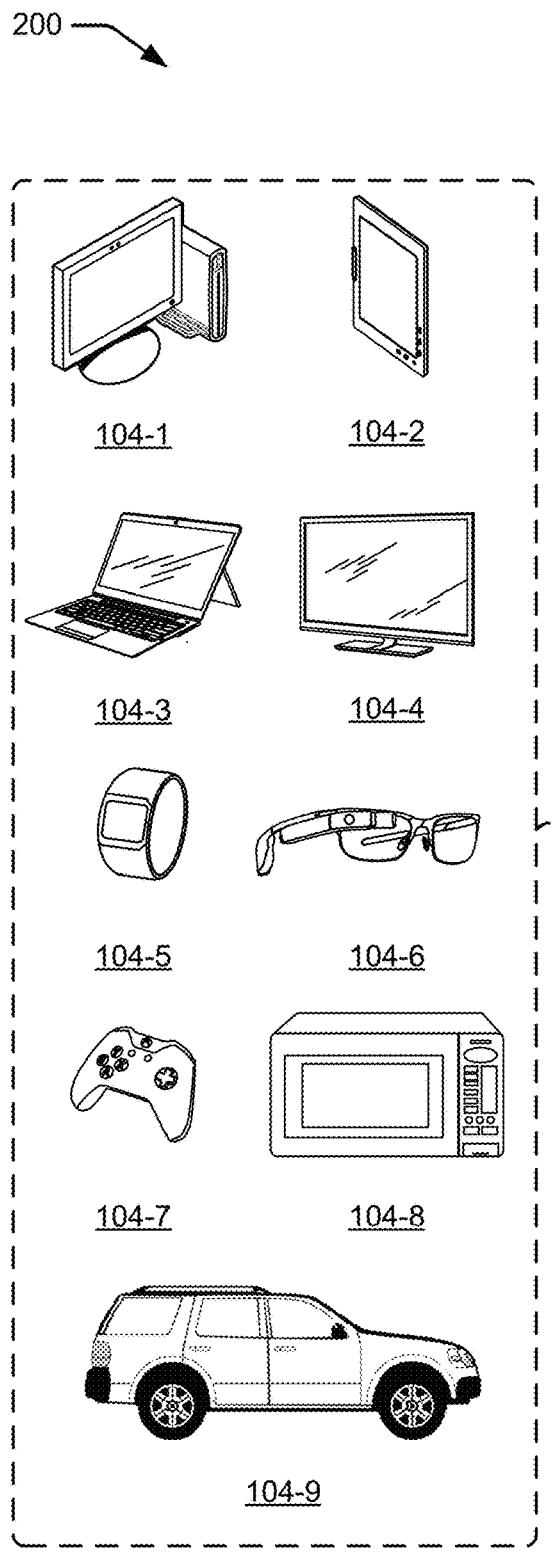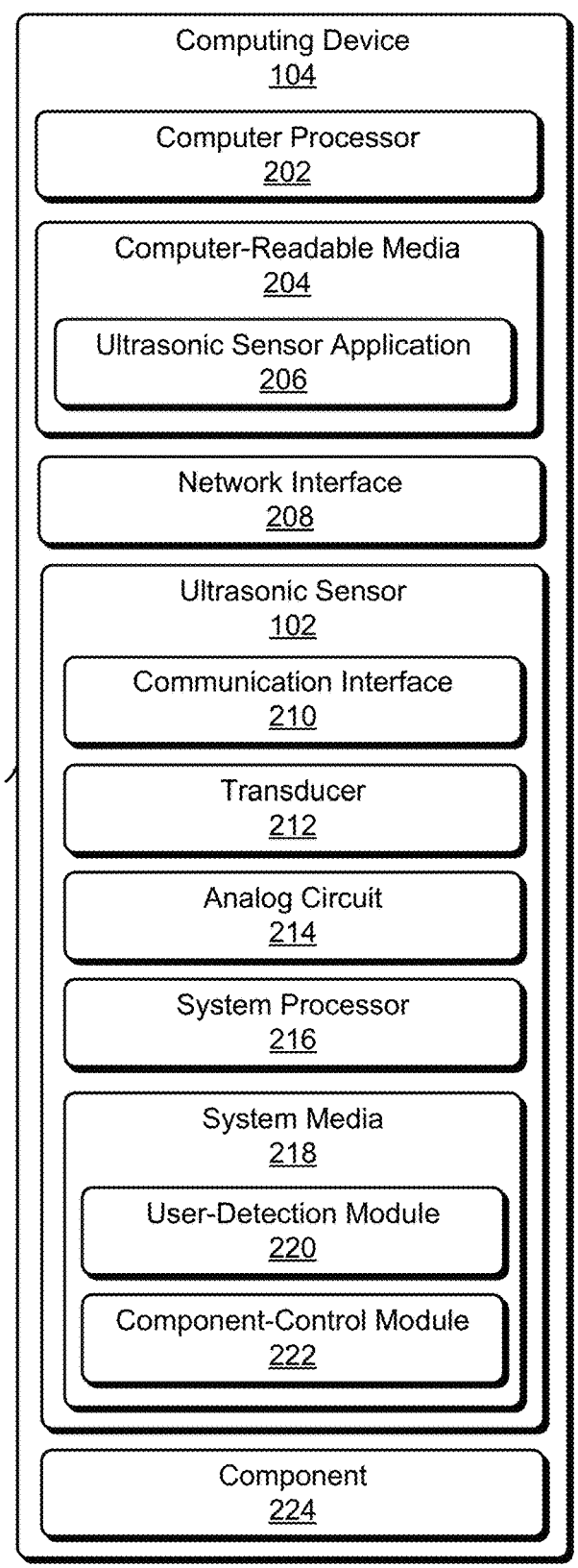
FIG. 2

1000

```
┌─────────────────────────────────────────────────┐
│ Transmit a first ultrasonic transmit signal     │
│ using a first transducer of an ultrasonic sensor│
│                    1002                         │
└─────────────────────────────────────────────────┘
                        │
                        ▼
┌─────────────────────────────────────────────────┐
│ Transmit a second ultrasonic transmit signal    │
│ using a second transducer of the ultrasonic     │
│ sensor, the first ultrasonic transmit signal    │
│ and the second ultrasonic transmit signal       │
│ having different waveforms                      │
│                    1004                         │
└─────────────────────────────────────────────────┘
                        │
                        ▼
┌─────────────────────────────────────────────────┐
│ Receive an ultrasonic receive signal, the       │
│ ultrasonic receive signal comprising a version  │
│ of the first ultrasonic transmit signal         │
│                    1006                         │
└─────────────────────────────────────────────────┘
                        │
                        ▼
┌─────────────────────────────────────────────────┐
│ Detect that the second transducer is occluded   │
│                    1008                         │
└─────────────────────────────────────────────────┘
                        │
                        ▼
┌─────────────────────────────────────────────────┐
│ Determine that an object is present responsive  │
│ to the detecting that the second transducer is  │
│ occluded                                        │
│                    1010                         │
└─────────────────────────────────────────────────┘
```

FIG. 10

DETECTING USER PRESENCE

RELATED APPLICATION(S)

This application is a national stage entry of International Application No. PCT/US2020/066935, filed Dec. 23, 2020, the disclosure of which is incorporated herein by reference in its entirety.

BACKGROUND

Computing devices (e.g., smartphones) may enable remote communication, access to information, enhance safety, and so forth. The portable design of a smartphone, for example, may enable a user to maintain open lines of communication while traveling away from stationary forms of communication (e.g., landline telephones, desktop computers). This smartphone may have access to the Internet, enable wireless communication, have useful applications installed (e.g., navigation, social media, news, shopping, banking, photo albums, music), and contain sensors (e.g., cameras, location sensors, health sensors).

New features for computing devices continue to be developed that facilitate operation or expand capabilities of the device with the utilization of sensors or high-performance circuitry. While users may find it advantageous to use these devices, there are many challenges associated with the development of computing-device technology. These challenges may include designing components to fit within size constraints of the computing device, operating components within available power limits of the device, and improving user experience.

SUMMARY

Techniques and apparatuses are described that detect user presence using an ultrasonic sensor. The ultrasonic sensor can detect user presence without relying on time-of-flight techniques. In particular, the ultrasonic sensor can determine that a user is present based on the occlusion of at least one receiving transducer (e.g., microphone occlusion), the occlusion of at least one transmitting transducer (e.g., speaker occlusion), or a detected change in an audible noise floor of at least one transducer. In this way, the ultrasonic sensor can continue to detect user presence in situations in which a user occludes one or more transducers of the ultrasonic sensor. The ultrasonic sensor can also control operation of another component within a computing device based on the presence of the user to improve the user experience and/or improve power management.

Aspects described below include a method performed by an ultrasonic sensor for detecting user presence. The method includes transmitting an ultrasonic transmit signal. The method also includes receiving an ultrasonic receive signal using a first transducer of the ultrasonic sensor. The ultrasonic receive signal comprises a version of the ultrasonic transmit signal. The method additionally includes detecting that a second transducer of the ultrasonic sensor is occluded. Responsive to the detecting that the second transducer is occluded, the method further includes determining that an object is present.

Aspects described below include another method performed by an ultrasonic sensor for detecting user presence. The method includes transmitting a first ultrasonic transmit signal using a first transducer of the ultrasonic sensor. The method also includes transmitting a second ultrasonic transmit signal using a second transducer of the ultrasonic sensor. The first ultrasonic transmit signal and the second ultrasonic transmit signal have different waveforms. The method additionally includes receiving an ultrasonic receive signal. The ultrasonic receive signal comprises a version of the first ultrasonic transmit signal. The method further includes detecting that the second transducer is occluded. Responsive to the detecting that the second transducer is occluded, the method also includes determining that an object is present.

Aspects described below include an additional method performed by an ultrasonic sensor for detecting user presence. The method includes receiving an audible receive signal. The method also includes detecting a change in a noise floor associated with the audible receive signal. Responsive to the detecting the change in the noise floor, the method additionally includes determining that an object is present.

Aspects described below also include an apparatus comprising an ultrasonic sensor configured to perform any of the described methods.

Aspects described below also include a system with means for detecting user presence.

BRIEF DESCRIPTION OF DRAWINGS

Apparatuses for and techniques for detecting user presence are described with reference to the following drawings. The same numbers are used throughout the drawings to reference like features and components:

FIG. 2 illustrates an example implementation of an ultrasonic sensor as part of a computing device;

FIG. 3-1 illustrates an example operation of an ultrasonic sensor as part of a computing device;

FIG. 3-2 illustrates an example sequence flow diagram for detecting user presence based on user proximity;

FIG. 3-3 illustrates an example sequence flow diagram for changing an operational state of a component of the computing device based on user presence;

FIG. 10 illustrates an example method for detecting user presence based on speaker occlusion;

DETAILED DESCRIPTION

Overview

Figure 1:
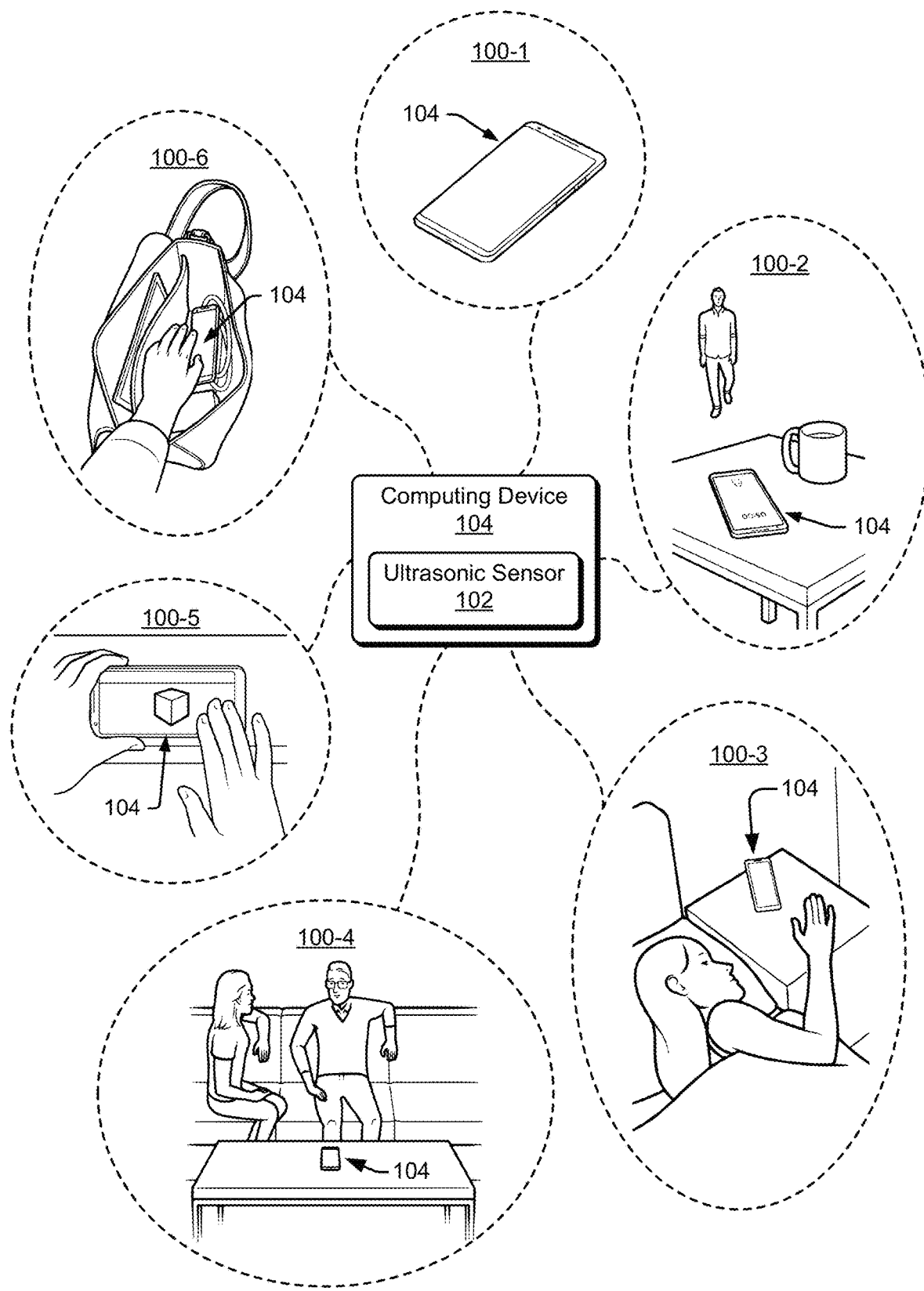
FIG. 1 illustrates example environments in which detecting user presence can be implemented.

New features for computing devices continue to be developed that facilitate operation or expand capabilities of the device with the utilization of sensors or high-performance circuitry. While users may find it advantageous to use these devices, there are many challenges associated with the development of computing-device technology. These challenges may include designing components to fit within size constraints of the computing device, operating components within available power limits of the device, and improving user experience.

One such challenge includes providing a desirable user experience on a computing device. A user may desire access to a user interface of the device without distractions. However, some sensors of the device may distract the user when in an active operational state. For example, when an optical sensor is in an active state (e.g., of operation), it may emit light to detect the proximity of nearby objects. The emitted light can be observed by the user in environments of both high and low ambient light when the optical sensor is in the active state. In some cases, the user may become distracted or annoyed by the light and forget their train of thought, resulting in an undesirable user experience. Optical sensors may also include photoconductive devices, photovoltaics, photodiodes, and phototransistors and have a variety of applications including generating, producing, distributing, or converting electrical power, and so forth.

Another challenge may be associated with size constraints or power limitations of the computing device. In the case of a smartphone, the user may desire a compact device that can easily fit in their pocket or handbag. These size constraints can limit the capabilities of the device. For example, a compact design may reduce the quantity or type of components available to enhance the user experience. The operation of these components can also have power limitations based on a battery capacity of the device. A compact smartphone design may require a smaller battery, which may limit the length of user activity on the device and/or operation of these components.

To address these challenges, this document describes techniques and devices for determining user presence using an ultrasonic sensor of a computing device. In some implementations, the ultrasonic sensor utilizes preexisting microphones and/or speakers on the device. This enables the ultrasonic sensor to be implemented on space-constrained devices. The ultrasonic sensor can further determine the distance between the user and the device in addition to the distance between the user and a component of the device (e.g., an optical sensor). The ultrasonic sensor can control operation of this component based on the presence of the user to improve the user experience and/or improve power management.

In one example, the ultrasonic sensor changes an operational state (e.g., on or off) of the component to improve the user experience. For example, the ultrasonic sensor can turn an optical sensor off (e.g., cause the optical sensor to be in an inactive state) to prevent light from being emitted while the user is nearby. This may prevent the user from becoming distracted by the light and facilitate a more enjoyable user experience. However, once the ultrasonic sensor detects that the user is within a threshold distance for operating the optical sensor, the ultrasonic sensor can trigger the optical sensor to transition to an active state in which it emits light. In this way, the ultrasonic sensor can reduce the amount of time that the optical sensor is active, thereby improving the user experience.

The ultrasonic sensor may also conserve power within the computing device to enhance the user experience. When detecting the presence of the user, the ultrasonic sensor may change the operational state of a component to manage power consumption of the device. For example, if the ultrasonic sensor determines that the user is not near the device, it can turn the component off to conserve power (e.g., turn a display screen off). If the ultrasonic sensor determines that the user is near the device, it can turn the component on to allow for start-up times. For example, when it is determined that the user is near the device, the component may be turned on in advance so that it is ready for use by the user. Therefore, the computing device does not have to rely on timers or manual input from the user to activate the component and may instead improve the user experience by reducing start-up delays.

Some ultrasonic sensors can detect user presence by relying on time-of-flight techniques. To utilize these techniques, these ultrasonic sensors measure the elapsed time between transmitted and received ultrasonic signals. In some situations, however, the ultrasonic sensor may be blocked from transmitting and/or receiving these ultrasonic signals. Consider an example in which the ultrasonic sensor is integrated within a hand-held computing device. In this example, a user's hand obstructs a transducer of the ultrasonic sensor from transmitting or receiving the ultrasonic signals. As such, these ultrasonic sensors are prevented from detecting the user using time-of-flight techniques.

In contrast, the described ultrasonic sensor can detect user presence without relying on time-of-flight techniques. In particular, the ultrasonic sensor can determine that a user is present based on the occlusion of at least one receiving transducer (e.g., microphone occlusion), the occlusion of at least one transmitting transducer (e.g., speaker occlusion), or a detected change in an audible noise floor of at least one transducer. In this way, the ultrasonic sensor can continue to detect user presence in situations in which a user occludes one or more transducers of the ultrasonic sensor. In some implementations, a transducer of the ultrasonic sensor is positioned proximate to a component that is controlled by the ultrasonic sensor. In this way, the ultrasonic sensor can continue to control the operational state of the component responsive to detecting that this transducer is occluded or experiences a change in the audible noise floor.

In some implementations, the ultrasonic sensor can utilize both time-of-flight techniques and non-time-of-flight techniques for detecting user presence. For example, the ultrasonic sensor can utilize time-of-flight techniques in situations in which the user does not occlude a transducer and utilize non-time-of-flight techniques (particularly the techniques disclosed herein) in situations in which the user occludes one or more transducers.

Example Environment

FIG. 1 is an illustration of example environments 100-1 to 100-6 in which techniques using, and an apparatus including, an ultrasonic sensor 102 may be embodied. In the depicted environments 100-1 to 100-6, the ultrasonic sensor 102 of a computing device 104 is capable of detecting one or more objects (e.g., users). The computing device 104 is shown to be a smartphone in environments 100-1 to 100-6. In general, the computing device 104 may, for example, be a computing device comprising a computer processor and computer-readable media.

In the environments 100-1 and 100-2, a user is located far from the computing device 104 and the ultrasonic sensor 102 does not detect the presence of the user. In environment 100-1, the computing device 104 is alone in an environment (e.g., an empty room). In environment 100-2, the user approaches the computing device 104 from a large distance. As an example, this distance can be on the order of several meters (e.g., greater than 5 meters). The ultrasonic sensor 102 does not detect the presence of the user in environments 100-1 and 100-2 because the user is beyond a maximum detection range of the ultrasonic sensor 102.

When the user is in close proximity to the computing device 104 (e.g., within the maximum detection range of the ultrasonic sensor 102), the ultrasonic sensor 102 detects the presence of the user. In environment 100-3, the user moves their hand towards the computing device 104, which decreases a distance between the computing device 104 and the hand of the user. In environment 100-4, two users are seated in close proximity (e.g., on a nearby couch) to the computing device 104. In this example, the ultrasonic sensor 102 may detect the presence of one or more users.

The ultrasonic sensor 102 also detects the presence of the user when the user is in contact with the computing device 104, as illustrated in environments 100-5 and 100-6. Contact between the user and the computing device 104 may include a touch with a hand, an abrasive motion with the hand, or a swipe or scroll movement of the hand. In environment 100-5, the hand touches a display of the computing device 104 and the ultrasonic sensor 102 detects the presence of the user. In environment 100-6, the user reaches for the computing device 104 stored within a purse and the ultrasonic sensor 102 detects the contact between the user and the computing device 104. The computing device 104 and the ultrasonic sensor 102 are further described with respect to FIG. 2.

Example Ultrasonic Sensor

Figures 1, 3:
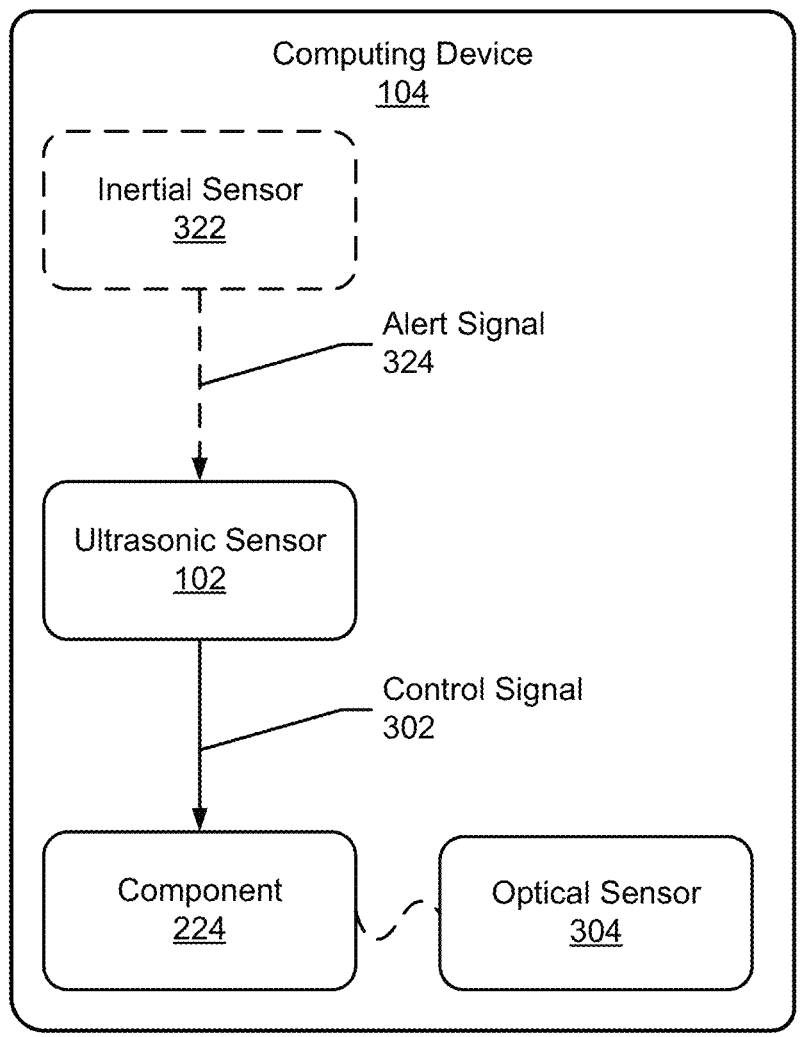
Figures 2, 3:
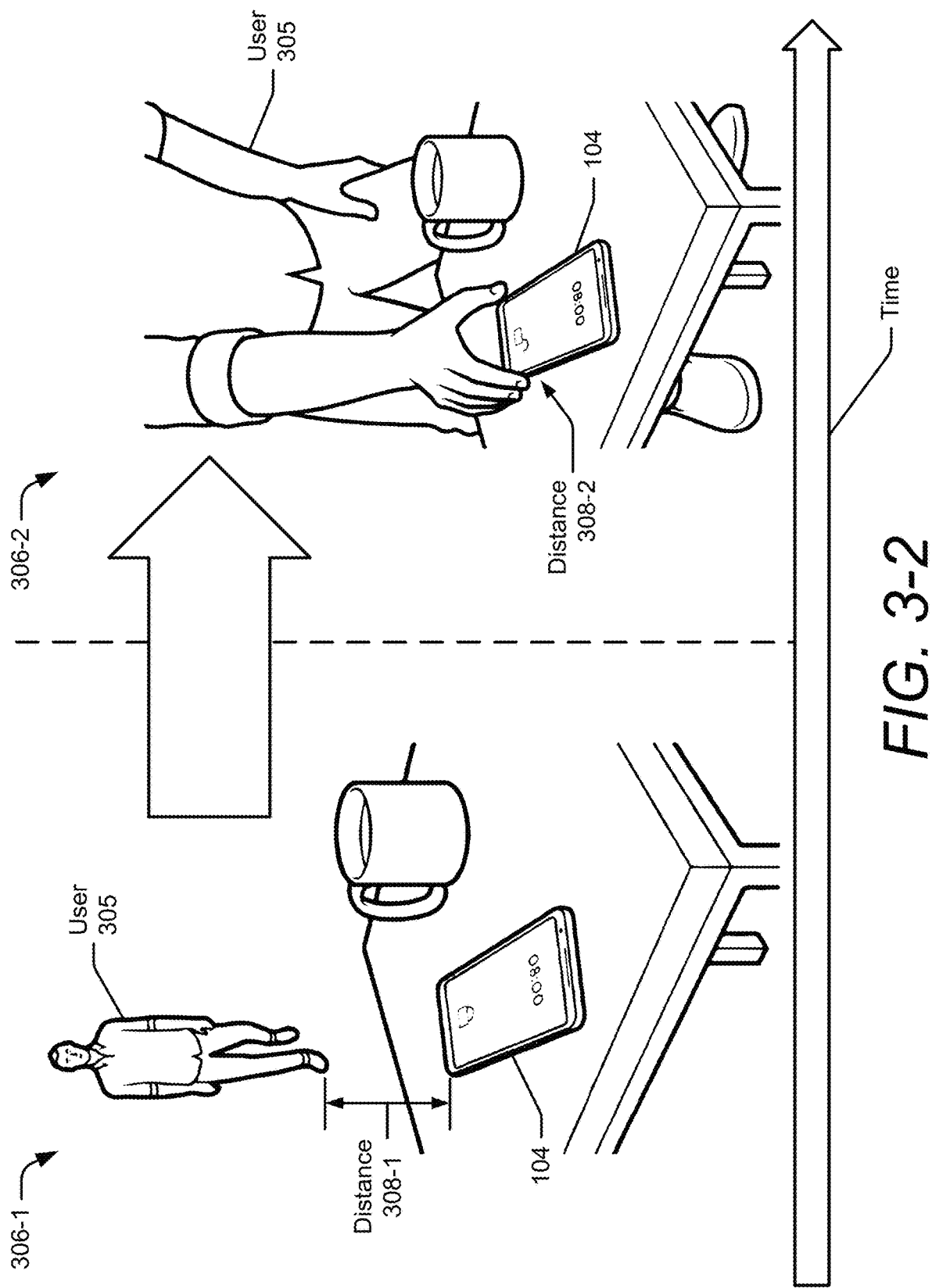
Figure 3:
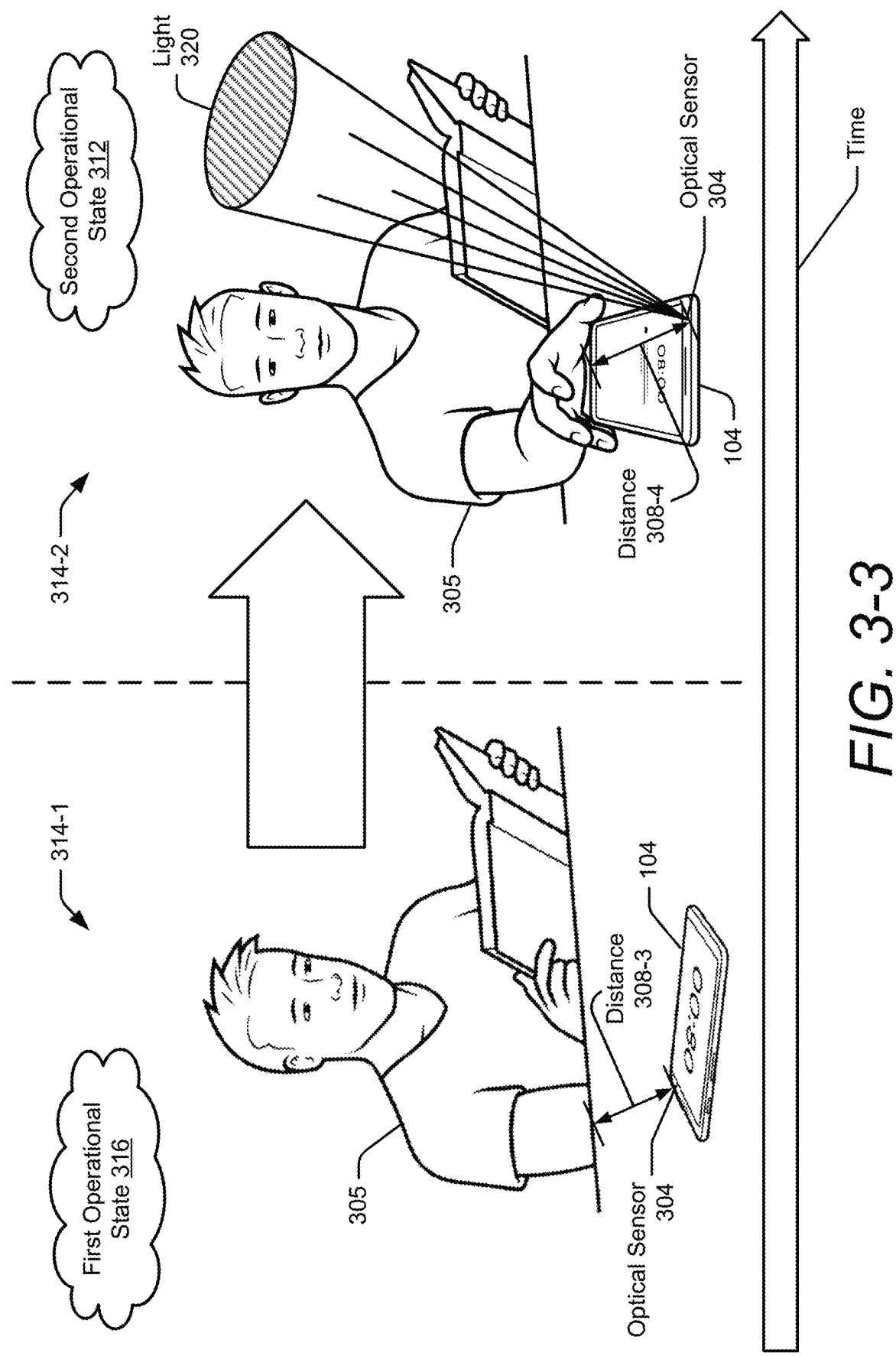

FIG. 2 illustrates the ultrasonic sensor 102 as part of the computing device 104. The computing device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, including a home-service device, a smart speaker, a smart thermostat, a security camera, a baby monitor, a WiFi® router, a drone, a trackpad, a drawing pad, a netbook, an e-reader, a home-automation and control system, a wall display, a virtual-reality headset, and another home appliance. Note that the computing device 104 can be wearable, non-wearable but mobile, or relatively immobile (e.g., desktops and appliances).

The computing device 104 includes one or more computer processors 202 and one or more computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes an ultrasonic sensor application 206, which uses data generated by the ultrasonic sensor 102 to perform functions. For example, the ultrasonic sensor application 206 uses the ultrasonic sensor data to perform functions to improve the user experience. If there is an occlusion of a speaker or a microphone of the computing device 104, the ultrasonic sensor application 206 may notify the user. For example, a notification may include an alert on a display of the computing device 104, an alert sound, or haptic feedback.

The computing device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The computing device 104 may also include a display (not shown).

The ultrasonic sensor 102 includes a communication interface 210 to transmit ultrasonic sensor data to a remote device, though this need not be used when the ultrasonic sensor 102 is integrated within the computing device 104. In general, the ultrasonic sensor data provided by the communication interface 210 is in a format usable by the ultrasonic sensor application 206.

The ultrasonic sensor 102 includes at least one transducer 212 that can convert electrical signals into sound waves. The transducer 212 can also detect and convert sound waves into electrical signals. These electrical signals and sound waves may include frequencies in an ultrasonic range and/or an acoustic range, either of which may be used for the detection of user presence.

A frequency spectrum (e.g., range of frequencies) that the transducer 212 uses to generate an ultrasonic signal can include frequencies from a low-end of the acoustic range to a high-end of the ultrasonic range, 20 hertz (Hz) to 2 megahertz (MHz) or include frequencies in the ultrasonic range, 20 kilohertz (kHz) to 2 MHz. In some cases, the frequency spectrum can be divided into multiple sub-spectrums that have similar or different bandwidths. For example, different frequency sub-spectrums may include 30 to 500 kHz, 30 to 70 kHz, 80 to 500 kHz, 1 to 2 MHz, 26 to 29 kHz, 31 to 34 kHz, or 33 to 36 kHz.

These frequency sub-spectrums can be contiguous or disjoint, and the transmitted signal can be modulated in phase and/or frequency. To achieve coherence, multiple frequency sub-spectrums (contiguous or not) that have a same bandwidth may be used by the transducer 212 to generate multiple ultrasonic signals, which are transmitted simultaneously or separated in time. In some situations, multiple contiguous frequency sub-spectrums may be used to transmit a single ultrasonic signal, thereby enabling the ultrasonic signal to have a wide bandwidth.

In an example implementation, the transducer 212 of the ultrasonic sensor 102 has a monostatic topology. With this topology, the transducer 212 can convert the electrical signals into sound waves and convert sound waves into electrical signals (e.g., can transmit or receive ultrasonic signals). Example monostatic transducers may include piezoelectric transducers, capacitive transducers, and micro-machined ultrasonic transducers (MUTs) that use microelectromechanical systems (MEMS) technology.

Alternatively, the transducer 212 can be implemented with a bistatic topology, which includes multiple transducers located at different positions on the computing device 104. In this case, a first transducer converts the electrical signal into sound waves (e.g., transmits ultrasonic signals) and a second transducer converts sound waves into an electrical signal (e.g., receives the ultrasonic signals). An example bistatic topology can be implemented using at least one microphone and at least one speaker. The microphone and speaker can be dedicated for operations of the ultrasonic sensor 102. Alternatively, the microphone and speaker can be shared by both the computing device 104 and the ultrasonic sensor 102.

The ultrasonic sensor 102 includes at least one analog circuit 214, which includes circuitry and logic for conditioning electrical signals in an analog domain. The analog circuit 214 can include a waveform generator, analog-to-digital converters, amplifiers, filters, mixers, and switches for generating and modifying electrical signals. In some implementations, the analog circuit 214 includes other hardware circuitry associated with the speaker or microphone.

The ultrasonic sensor 102 also includes one or more system processors 216 and one or more system media 218 (e.g., one or more computer-readable storage media). The system processor 216 processes the electrical signals in a digital domain. The system media 218 optionally includes a user-detection module 220 and a component-control module 222. The user-detection module 220 and the component-control module 222 can be implemented using hardware, software, firmware, or a combination thereof. In this example, the system processor 216 implements the user-detection module 220 and the component-control module 222. Together, the user-detection module 220 and the component-control module 222 enable the system processor 216 to process responses (e.g., electrical signals) from the transducer 212 to detect the presence of the user and change the operational state of a component 224, respectively.

The user-detection module 220 detects the presence of the user based on the electrical signals received by the transducer 212. In FIG. 1, the user-detection module 220 detects the user's presence using time-of-flight techniques when the user is in close proximity to the computing device 104, as illustrated in environments 100-3 and 100-4. The user-detection module 220 also detects the user's presence using non-time-of-flight techniques when the user is in contact with the computing device 104, as illustrated in environments 100-5 and 100-6.

Responsive to detecting user presence, the component-control module 222 controls the operational state of at least one component 224 of the computing device 104. In FIG. 1, the ultrasonic sensor 102 detects the user(s) in environments 100-3, 100-4, 100-5, and 100-6 due to the close proximity or contact between the user and the computing device 104. In response, the component-control module 222 triggers a change in the operational state (e.g., active or inactive state) of the component 224 to improve the user experience and/or manage power of the computing device 104.

The computing device 104 includes a component 224 that is distinct (e.g., separate) from the ultrasonic sensor 102 and has at least two operational states. In some examples, the component 224 consumes different amounts of power in different operational states. In other examples, the component 224 operates differently in various operational states (e.g., selectively emits sound in a first operational state and remains quiet in a second operational state, selectively emits light in a first operational state and does not emit light in a second operational state, transmits radio-frequency signals at different power levels or beam steering angles). Example components 224 are further described with respect to FIG. 3-1.

FIG. 3-1 illustrates example interconnections between the ultrasonic sensor 102 and other components of the computing device 104. In the depicted example, the ultrasonic sensor 102 is connected (directly or indirectly) to the component 224. During operation, the ultrasonic sensor 102 passes a control signal 302 to the component 224 to change an operational state of the component 224. For example, the control signal 302 can include a command to change the operational state of the component 224 from an inactive state to an active state (or vice versa), a command to adjust the amount of power consumed by the component 224, or a command to change the emitted sound or light from the computing device 104. In other implementations not shown, the ultrasonic sensor 102 can pass the control signal 302 to the computer processor 202 (of FIG. 2), which forwards the control signal 302 to the component 224.

As an example, the component 224 can include an optical sensor 304, which emits light in an active state and does not emit light in an inactive state. Additionally or alternatively, the component 224 can include a location sensor, a camera, a display, a health sensor, an accelerometer, a barometer, an inertial-motion sensor, or a wireless-communication module. An example sequence of events can cause the ultrasonic sensor 102 to change the operational state of the component 224, as further described with respect to FIGS. 3-2 and 3-3.

FIGS. 3-2 and 3-3 each illustrate a sequence flow diagram, with time progressing from left to right. At 306-1, a user 305 is a distance 308-1 away from the computing device 104. The distance is large enough (e.g., 5 meters or greater) that the ultrasonic sensor 102 does not detect the presence of the user 305. When the user 305 approaches the computing device 104 and is at a smaller distance 308-2 illustrated at 306-2, the ultrasonic sensor 102 detects the user 305's presence due to the user 305 being within a detectable range of the ultrasonic sensor 102.

FIG. 3-3 illustrates the ultrasonic sensor 102 changing the operational state of a component 224. In this example, the component 224 is the optical sensor 304, which emits light in a second operational state 312 (e.g., an active state). At 314-1, the ultrasonic sensor 102 causes the optical sensor 304 to be in a first operational state 316 (e.g., an inactive state) in which the sensor is not emitting light because the user 305 is located a distance 308-3 greater than a threshold distance away from the computing device 104. As an example, this threshold distance can be five centimeters. In this case, the ultrasonic sensor 102 can detect the presence of the user 305 in 314-1, but the user 305 is far enough away from the optical sensor 304 to keep the component 224 in the inactive state.

At 314-2, the user 305 reaches for the computing device 104, thereby causing the user 305 to be a distance 308-4 away from the computing device 104. In this case, the distance 308-4 is less than the threshold distance (e.g., five centimeters). As such, the ultrasonic sensor 102 triggers the optical sensor 304 to change operational states. The optical sensor 304 changes from the first operational state 316 to the second operational state 312, in which it emits light 320 to detect a close proximity of the user 305 or perform other operations.

While the example component 224 of FIGS. 3-1 and 3-3 is shown to be an optical sensor 304, the component 224 may also include other types of components mentioned in FIG. 3-1. For example, if the component 224 is a display, the ultrasonic sensor 102 can control a brightness of the display based on the user 305's presence to improve the user experience or save power while the user 305 is not present. In this example, the user 305 reaches for the computing device 104, thereby triggering the component 224 to increase the display brightness. The user 305 may find it enjoyable for the display to automatically brighten. In this way, the ultrasonic sensor 102 anticipates the needs or desires of the user 305.

Returning to FIG. 3-1, the computing device 104 can optionally include an inertial sensor 322 that detects motion of the computing device 104. The inertial sensor 322 can control an operational state of the ultrasonic sensor 102 based on the motion or lack of motion of the computing device 104. If the inertial sensor 322 detects motion of the computing device 104, the inertial sensor 322 passes an alert signal 324 to the ultrasonic sensor 102 to indicate that the computing device 104 is in motion and likely being held by the user 305. The alert signal 324 triggers a change in the operational state of the ultrasonic sensor 102.

In other implementations, the inertial sensor 322 can affect the ultrasonic sensor 102's control of the component 224. For example, the ultrasonic sensor 102 can cause the optical sensor 304 to transition from the first operational state 316 to the second operational state 312 responsive to determining that the user 305 is less than the threshold distance from the optical sensor 304 and the alert signal 324 indicating that the computing device 104 is in motion. In this case, the ultrasonic sensor 102 can be in the active state even if the alert signal 324 indicates that the computing device 104 is stationary.

For example, in FIG. 3-2, the ultrasonic sensor 102 operates in an inactive state or power-saving state at 306-1. At 306-2, the inertial sensor 322 detects motion of the computing device 104 as the user 305 touches the computing device 104. As a result, the inertial sensor 322 causes the ultrasonic sensor 102 to transition from the inactive state to an active state. In the active state, the ultrasonic sensor 102 transmits and receives ultrasonic signals and detects the user 305. By controlling the operational state of the ultrasonic sensor 102, the inertial sensor 322 can enable the computing device 104 to conserve power in situations in which the computing device 104 is stationary and the user 305 is outside a detectable range of the ultrasonic sensor 102. In this way, the inertial sensor 322 limits the operation of the ultrasonic sensor 102 to situations in which the user 305 is likely present and/or interacting with the computing device 104 (e.g., causing it to move.)

At 306-2, 314-1, and 314-2, the ultrasonic sensor 102 can utilize time-of-flight techniques, occlusion-detection techniques (e.g., non-time-of-flight techniques), or a combination thereof to detect the user. Operations of the ultrasonic sensor 102 for detecting user presence are further described with respect to FIG. 4.

Figure 4:
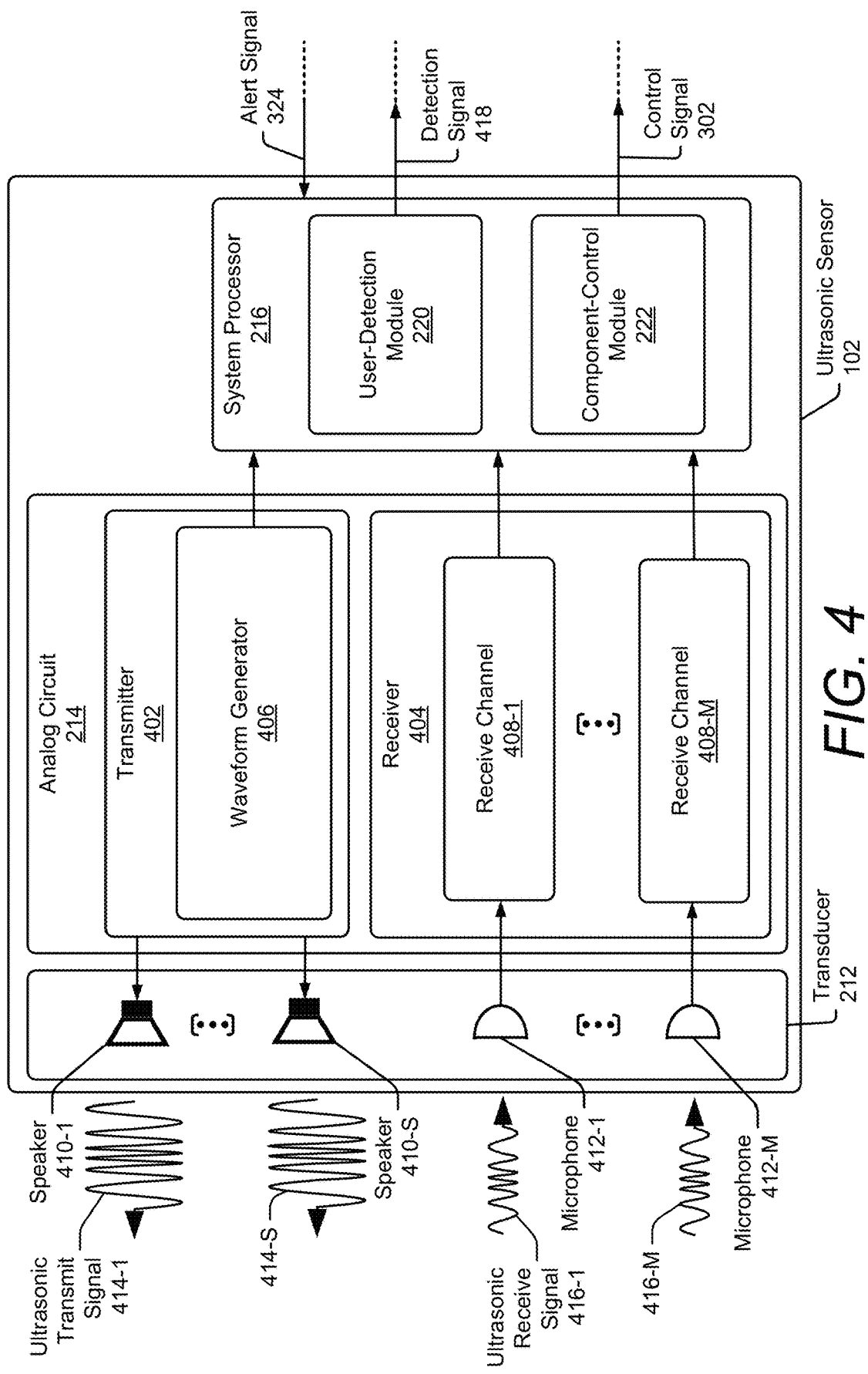
FIG. 4 illustrates example implementations of a transducer, an analog circuit, and a system processor of an ultrasonic sensor.

FIG. 4 illustrates example implementations of the transducer 212, the analog circuit 214, and the system processor 216 of the ultrasonic sensor 102. In the depicted configuration, the analog circuit 214 is coupled between the transducer 212 and the system processor 216. The analog circuit 214 includes a transmitter 402 and a receiver 404. The transmitter 402 includes a waveform generator 406 coupled to the system processor 216. The receiver 404 includes multiple receive channels 408-1 to 408-M, where M represents a positive integer. In other implementations not shown, the receiver 404 includes a single receive channel 408-1. The receive channels 408-1 to 408-M are coupled to the system processor 216.

The transducer 212 is implemented with a bistatic topology, which includes at least one speaker 410-1 and at least one microphone 412-1. The speaker 410-1 is coupled to the transmitter 402, and the microphone 412-1 is coupled to a receive channel 408-1 of the receiver 404. In FIG. 4, an additional speaker 410-S is shown coupled to the transmitter 402, and an additional microphone 412-M is shown coupled to the receive channel 408-M, where S includes integer values corresponding to the quantity of speakers and M includes integer values corresponding to the quantity of microphones utilized by the ultrasonic sensor 102.

Although the ultrasonic sensor 102 in FIG. 4 includes multiple speakers 410-1 and 410-S and multiple microphones 412-1 and 412-M, other implementations of the ultrasonic sensor 102 can include a single speaker and a single microphone, multiple speakers and one microphone, single speaker and multiple microphones, or other types of transducers capable of transmitting and/or receiving. In some implementations, the speakers 410-1 to 410-S and microphones 412-1 to 412-M can also operate with audible signals. For example, the computing device 104 can play music through the speakers 410-1 to 410-S and detect the user 305's voice using the microphones 412-1 to 412-M.

During transmission, the transmitter 402 passes electrical signals to the speakers 410-1 to 410-S, which emit ultrasonic transmit signals 414-1 and 414-S, respectively. In particular, the waveform generator 406 generates the electrical signals which can have similar waveforms (e.g., similar amplitudes, phases, and frequencies) or different waveforms (e.g., different amplitudes, phases, and/or frequencies). The waveform generator 406 also communicates the electrical signals to the system processor 216 for digital signal processing. The ultrasonic transmit signals 414-1 to 414-S may or may not be reflected by an object (e.g., the user 305).

During reception, each microphone 412-1 to 412-M receives a version of the ultrasonic receive signal 416-1 to 416-M, respectively. Relative phase differences, frequencies, and amplitudes between the ultrasonic receive signals 416-1 to 416-M and the ultrasonic transmit signals 414 to 414-S may vary due to the interaction of the ultrasonic transmit signals 414-1 to 414-S with a nearby object or the external environment (e.g., path loss, noise sources). The ultrasonic receive signals 416-1 to 416-M can have different phases based on positions of the microphones 412-1 and 412-M on the computing device 104. Thus, "a version of an ultrasonic transmit signal" refers to the ultrasonic transmit signal after it has interacted with a nearby object (e.g., a user) and/or the environment. In general, such interactions may change one or more properties of the transmit signal (e.g., a frequency, phase and/or amplitude of the transmit signal), otherwise distort the transmit signal (e.g., by adding or removing one or more frequency components, or changing the amplitude and/or phase of one or more frequency components relative to other frequency components) and/or introduce a time delay.

Depending on the situation, the ultrasonic receive signals 416-1 and 416-M can each include a version of the ultrasonic transmit signal 414-1, a version of the ultrasonic transmit signal 414-S, an audible signal, or some combination thereof. In other situations, at least one of the ultrasonic receive signals 416-1 and 416-M do not include versions of the ultrasonic transmit signals 414-1 or 414-S.

The system processor 216 includes the user-detection module 220 and the component-control module 222. The user-detection module 220 accepts signals from the waveform generator 406 and the receive channels 408-1 and 408-M and analyzes these signals to determine the user 305's presence. In some cases, the user-detection module 220 uses a digital filter to separate signals within the audible frequency range and the ultrasonic frequency range. Example occlusion-detection techniques are further described with respect to FIGS. 6-8. The user-detection module 220 can also perform range compression, baseband processing, clutter filter cancellation, constant-false-alarm-rate detection, and/or heuristics.

In some cases, the user-detection module 220 uses time-of-flight techniques and/or triangulation techniques to directly measure the slant range and angle to the user 305, respectively. In this way, the user-detection module 220 can determine a relative location of the user 305. Additionally, if a relative location of the component 224 is known by the ultrasonic sensor 102, the user-detection module 220 can also determine a relative location of the user 305 with respect to the component 224. With this knowledge, the ultrasonic sensor 102 can execute finer control over the operational state of the component 224 based on the relative location of the user 305 with respect to the component 224.

In other cases, the user-detection module 220 uses occlusion-detection techniques for detecting user presence. These occlusion-detection techniques (e.g., non-time-of-flight techniques) are further described with respect to FIGS. 6-8.

Responsive to detecting the user 305, the user-detection module 220 can transmit a detection signal 418 to the ultrasonic sensor application 206. The detection signal 418 can alert the computing device 104 to the detection event and pass along additional ultrasonic sensor data (e.g., information about the location or movement of the user). The user-detection module 220 can also pass the detection signal 418 to the component-control module 222. Based on the detection signal 418, the component-control module 222 generates the control signal 302, which controls the operational state of the component 224, as illustrated in FIG. 3-3.

In some implementations, the system processor 216 accepts the alert signal 324 from the inertial sensor 322 (of FIG. 3-1). Based on the alert signal 324, the system processor 216 causes the ultrasonic sensor 102 to operate in an inactive state or an active state. Example positions of the microphones 412-1 to 412-M and speakers 410-1 and 410-S on the computing device 104 are further described with respect to FIG. 5.

Figure 5:
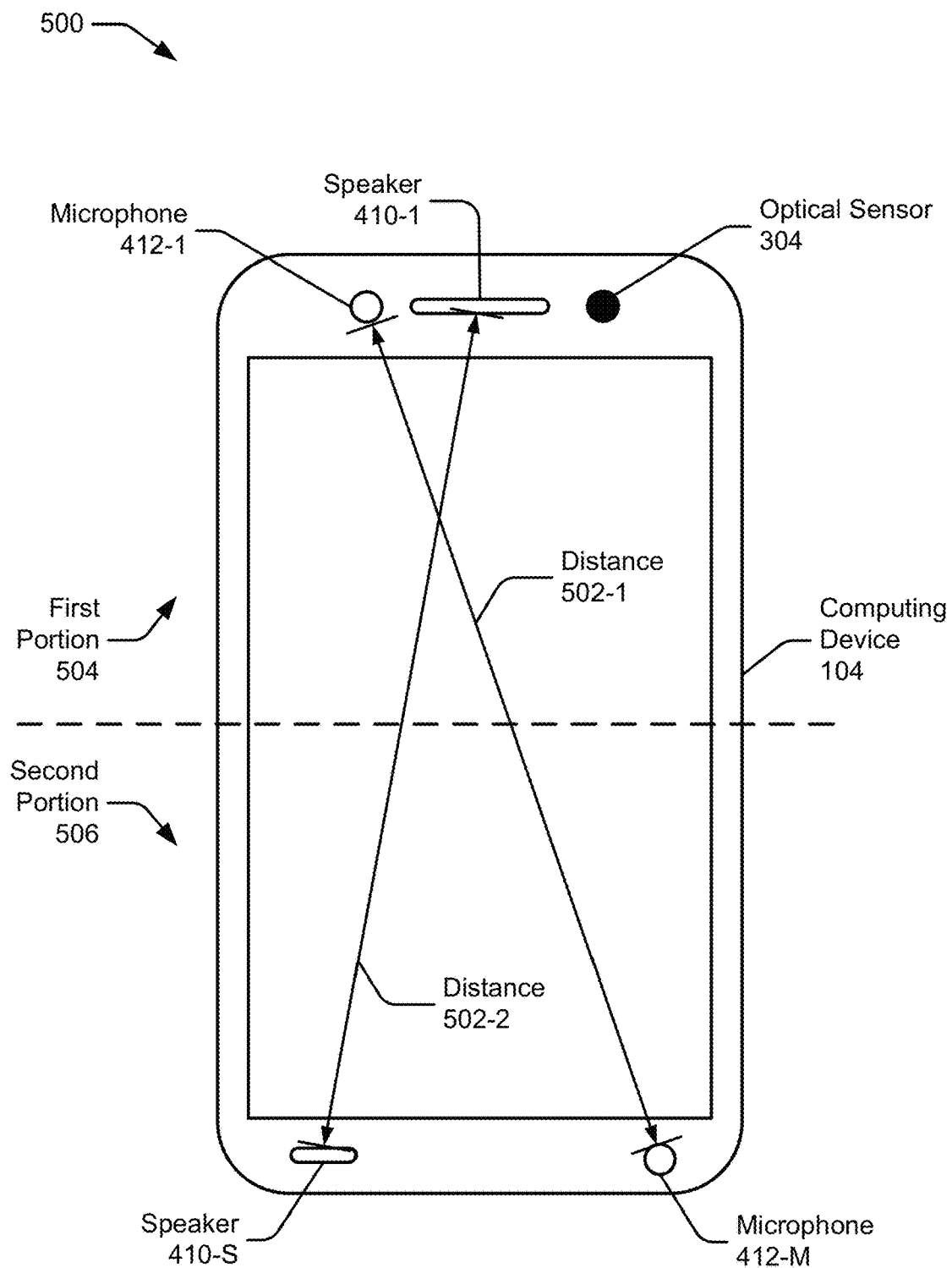
FIG. 5 illustrates example microphone, speaker, and optical sensor positions on a computing device.

FIG. 5 illustrates example positions for the microphones 412-1 to 412-M and the speakers 410-1 to 410-S on the computing device 104. Although the example computing device 104 of FIG. 5 is shown to include multiple microphones 412-1 and 412-M and multiple speakers 410-1 and 410-S, the ultrasonic sensor 102 may operate with one or more of these microphones 412-1 to 412-M and one or more these speakers 410-1 to 410-S at any given time.

In environment 500, the microphone 412-1 is positioned a distance 502-1 away from the microphone 412-M, and the speaker 410-1 is positioned a distance 502-2 away from the speaker 410-S. In some implementations, the distances 502-1 and 502-2 can be at least five centimeters. Additionally or alternatively, the microphones 412-1 to 412-M and the speakers 410-1 to 410-S are positioned within different portions of the computing device 104. Consider an example in which the computing device 104 includes first portion 504 and second portion 506 defined by a plane that is perpendicular to a longest edge of the computing device 104 and passes through a middle of the computing device 104. In this example, the speaker 410-1 is positioned within the first portion 504, and the speaker 410-S is positioned with the second portion 506. Similarly, the microphone 412-1 is positioned within the first portion 504, and the microphone 412-M is positioned with the second portion 506. In general, the positions of the microphones 412-1 to 412-M are such that a user is unlikely to occlude all of the microphones 412-1 to 412-M with a common grip. In other words, the distance 502-1 is sufficiently far to enable at least one of the microphones 412 to not be occluded by an appendage of the user, which occludes at least one of the other microphones 412. Similarly, the positions of the speakers 410-1 to 410-S are such that a user is unlikely to occlude all of the speakers 410-1 to 410-S with a common grip. In other words, the distance 502-2 is sufficiently far to enable at least one of the speakers 410 to not be occluded by an appendage of the user, which occludes at least one of the other speakers 410.

The computing device 104 is also shown in FIG. 5 to include the optical sensor 304 positioned near (e.g., proximate to) the microphone 412-1 and speaker 410-1. In this way, the ultrasonic sensor 102 can utilize occlusion-detection techniques to control the operational state of the optical sensor 304. If the ultrasonic sensor 102 detects that the user 305 is close to the microphone 412-1 and/or speaker 410-1, for example, the ultrasonic sensor 102 can assume that the user 305 is also close to the optical sensor 304 and adjust the operational state of the optical sensor 304 accordingly. The ultrasonic sensor 102 of this example computing device 104 can detect user presence based on occlusion of one or more microphones (412-1 or 412-M), occlusion of one or more speakers (410-1 or 410-S), and/or a change in an audible noise floor, as further described with respect to FIGS. 6, 7, and 8.

In an example implementation, the ultrasonic sensor 102 uses a single microphone (e.g., microphone 412-1) and a single speaker (e.g., speaker 410-1). In this case, the ultrasonic sensor 102 can detect user presence using occlusion detection techniques. During operation, the speaker 410-1 transmits an ultrasonic transmit signal 414-1. If the microphone 412-1 does not receive the ultrasonic receive signal 416-1, then the user-detection module 220 determines that the user 305 is present and occludes either the speaker 410-1 or the microphone 412-1. The component-control module 222 can transmit a control signal 302 to the component 224 to change its operational state. In this example, the ultrasonic sensor 102 may not be able to determine which transducer 212 (speaker 410-1 or microphone 412-1) is occluded. For better localization of an occlusion, the ultrasonic sensor 102 can utilize multiple microphones 412 and/or speakers 410, as further described with respect to FIGS. 6 and 7.

Figure 6:
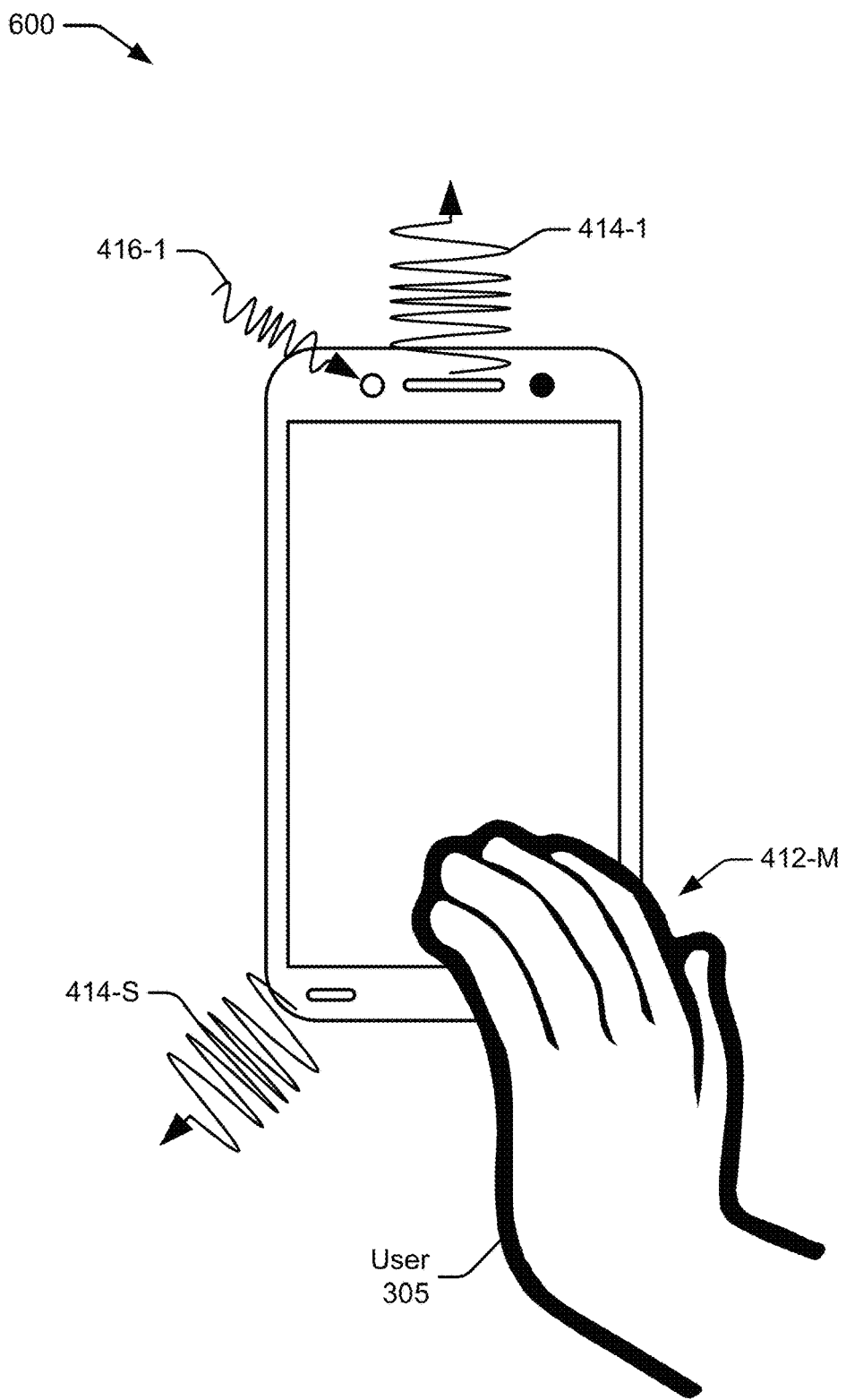
FIG. 6 illustrates an example technique for detecting user presence based on microphone occlusion.

FIG. 6 illustrates an example technique for detecting user presence based on microphone occlusion. In environment 600, the ultrasonic sensor 102 transmits at least one of the ultrasonic transmit signals 414-1 and 414-S using the speakers 410-1 and 410-S, respectively. The ultrasonic sensor 102, however, only receives the ultrasonic receive signal 416-1 using the microphone 412-1. The ultrasonic receive signal 416-1 represents a version of the ultrasonic transmit signal 414-1 and/or 414-S, which may or may not be reflected by the user 305. In this case, the microphone 412-M either does not receive the ultrasonic receive signal 416-M or receives the ultrasonic receive signal 416-M with insufficient amplitude for detection due to occlusion of microphone 412-M by a hand of the user 305.

The receiver 404 passes this information to the system processor 216. The user-detection module 220 determines that the microphone 412-M is occluded and generates the detection signal 418 to indicate that the user 305 is present. The detection signal 418 can further indicate that the user 305 is proximate to the microphone 412-M. In some situations, the component-control module 222 can transmit the control signal 302 to change the operational state of a component 224. For example, if the user 305 reaches for the computing device 104 and occludes the microphone 412-M, the ultrasonic sensor 102 can detect this occlusion and trigger the optical sensor 304 to change to the second operational state 312, as shown in FIG. 3-3.

Figure 7:
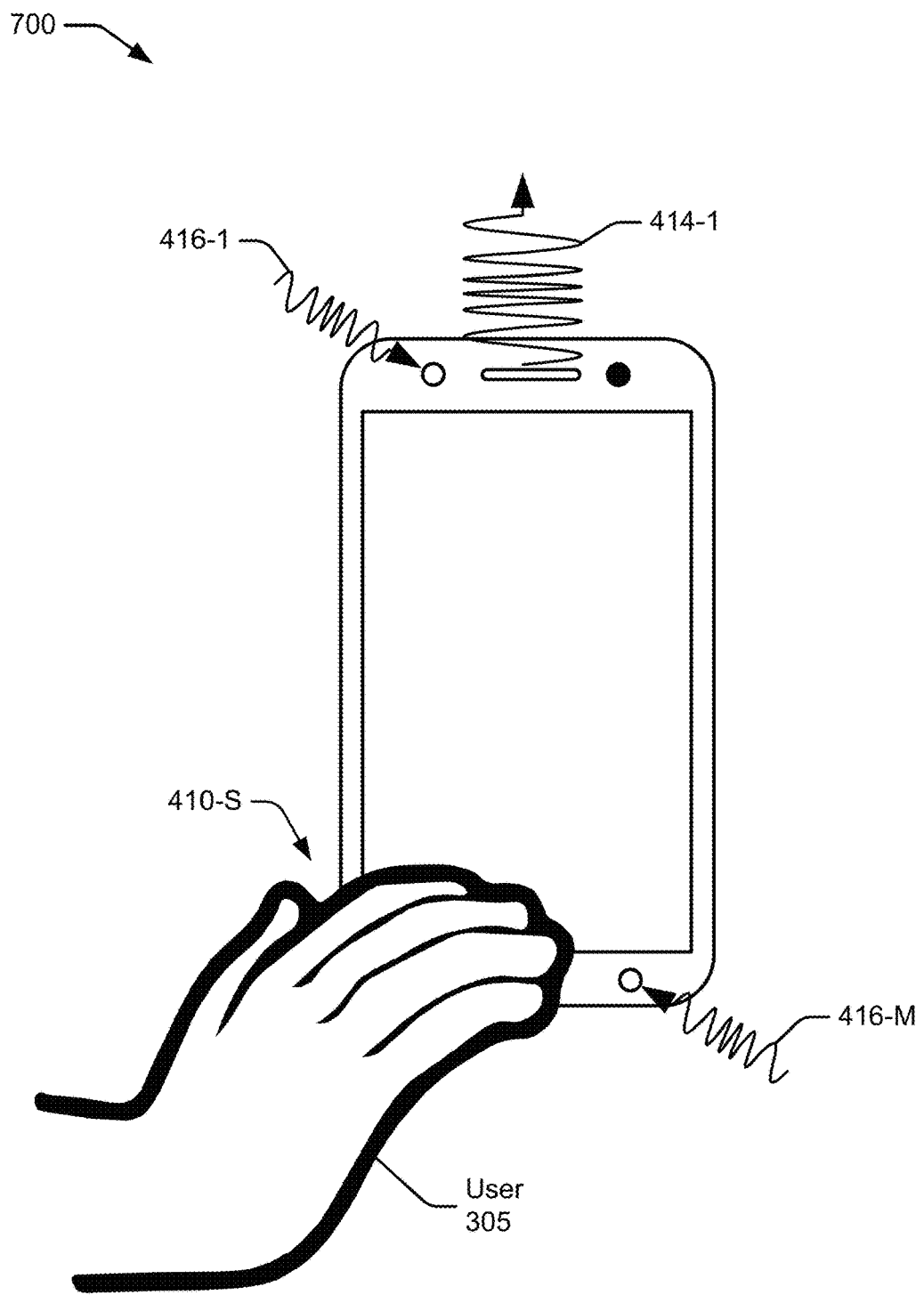
FIG. 7 illustrates another example technique for detecting user presence based on speaker occlusion.

FIG. 7 illustrates another example technique for detecting user presence based on speaker occlusion. In environment 700, the ultrasonic sensor 102 transmits ultrasonic transmit signals 414-1 to 414-S. The ultrasonic transmit signals 414-1 to 414-S have different waveforms in order to enable the ultrasonic sensor 102 to distinguish between received versions of these signals. In FIG. 7, the ultrasonic transmit signal 414-S is not explicitly depicted because the hand of the user 305 is blocking the speaker 410-S. The ultrasonic sensor 102 receives at least one of the ultrasonic receive signals 416-1 to 416-M, which include a version of the ultrasonic transmit signal 414-1. The version of the ultrasonic transmit signal 414-1 may or may not be reflected by the hand of the user 305.

The receiver 404 passes this information to the system processor 216. The user-detection module 220 determines that the speaker 410-S is occluded and generates the detection signal 418 to indicate that the user 305 is present. The detection signal 418 can further indicate that the user 305 is proximate to the speaker 410-S. In some situations, the component-control module 222 can transmit the control signal 302 to change the operational state of a component 224. For example, if the user 305 reaches for the computing device 104 and occludes the speaker 410-S, the ultrasonic sensor 102 can detect this occlusion and trigger the optical sensor 304 to change to the second operational state 312, as shown in FIG. 3-3.

In another example implementation, the ultrasonic sensor 102 detects user presence using a single microphone (e.g., microphone 416-1). In this case, the microphone 416-1 does not receive detectable versions of the ultrasonic transmits signals 414-1 to 414-S. In this case, the ultrasonic sensor 102 determines that the user 305 is present and occludes the speakers 410-1 to 410-S and/or the microphone 416-1.

In yet another example implementation, the ultrasonic sensor 102 detects user presence based on speaker occlusion using two microphones and a single speaker (e.g., speaker 410-1). In this case, the speaker 410-1 transmits the ultrasonic transmit signal 414-1. If both microphones 412-1 and 412-M do not receive detectable versions of the ultrasonic transmit signal 414-1, then the ultrasonic sensor 102 determines that the speaker 410-1 is occluded (e.g., by a hand of the user 305).

Figure 8:
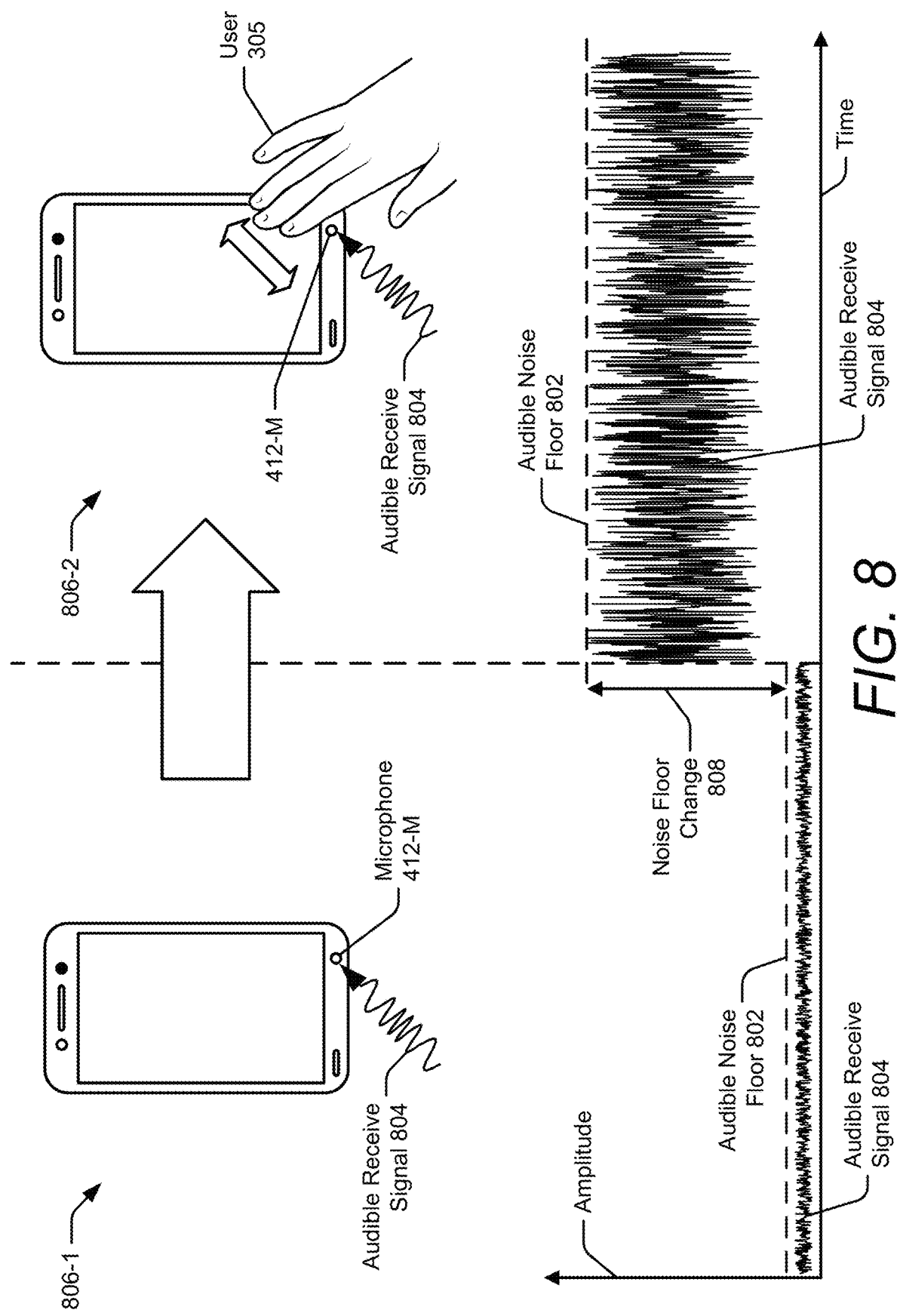
FIG. 8 illustrates an additional example technique for detecting user presence based on a change in an audible noise floor.

FIG. 8 illustrates an example technique for detecting user presence based on a change in an audible noise floor 802. As shown in FIG. 8, an example sequence of events causes the audible noise floor 802 associated with an audible receive signal 804 to change. In some cases, the audible noise floor 802 can change due to an abrasive motion of the hand of the user 305 across or near the microphone 412-M (e.g., rubbing of the hand, movement of a finger).

In environment 806-1, the microphone 412-M is free of occlusion and receives the audible receive signal 804. The audible receive signal 804 has a corresponding audible noise floor 802. The audible noise floor 802 at this time features a low amplitude. At a later time in environment 806-2, the user 305 moves their hand over or next to the microphone 412-M, which results in an abrasive motion across the computing device 104. This contact between the user 305 and the computing device 104 increases the amplitude of the audible noise floor 802, resulting in a noise floor change 808 that can be detected by the ultrasonic sensor 102.

In general, the noise floor change 808 can include a change in amplitude, frequency, and/or phase of the audible noise floor 802. In FIG. 8, the noise floor change 808 includes a detectable change in the audible noise floor 802 over time. For example, a detectable change can include the amplitude of the audible noise floor 802 increasing by 50% or more. In environment 806-2, the amplitude of the audible noise floor 802 increases significantly due to the rubbing motion made by the user 305.

Alternatively, the noise floor change 808 can include a decrease in the amplitude of the audible noise floor 802. For example, if the user 305 occludes at least a portion of the microphone 412-M, the audible noise floor 802 can decrease due to a reduction in detected ambient noise. The ultrasonic sensor 102 can detect this noise floor change 808 and determine that the user 305 is within close proximity of the computing device 104.

Additionally or alternatively, the ultrasonic sensor 102 can detect user presence by comparing the audible noise floor 802 to a noise floor associated with the ultrasonic frequency range (e.g., an ultrasonic noise floor). If the audible noise floor 802 has a higher amplitude than the ultrasonic noise floor (e.g., by 50% or more), the ultrasonic sensor 102 determines that the user is present.

The ultrasonic sensor 102 can also analyze a shape of the audible receive signal 804 to detect the user 305. In some situations, a frequency spectrum of the audible receive signal 804 has a Gaussian shape if the microphone 412-M is free of occlusion and an irregular shape if the user 305 is proximate to the microphone 412-M. By detecting a change in the audible noise floor 802, detecting a difference between the audible noise floor 802 and the ultrasonic noise floor, and/or detecting a change in the shape of the audible receive signal 804, the ultrasonic sensor 102 can detect the user 305 using a single receiving transducer 212.

In some implementations, the ultrasonic sensor 102 can also detect user presence based on a change in an ultrasonic noise floor (not depicted). Similar techniques as described above with respect to detecting the change in the audible noise floor 802 can be applied to detect the presence of the user 305 based on a change in the ultrasonic noise floor.

Though not depicted, the techniques for detecting user presence described in FIGS. 6-8 can apply to a computing device 104 that includes any at least one microphone, where M is greater than or equal to 1, and at least one speaker, where S is greater than or equal to 1. For example, the ultrasonic sensor 102 can perform operations using M microphones and S speakers to detect occlusion of one or more transducers 212, where M and S are integer values.

Example Methods

Figure 9:
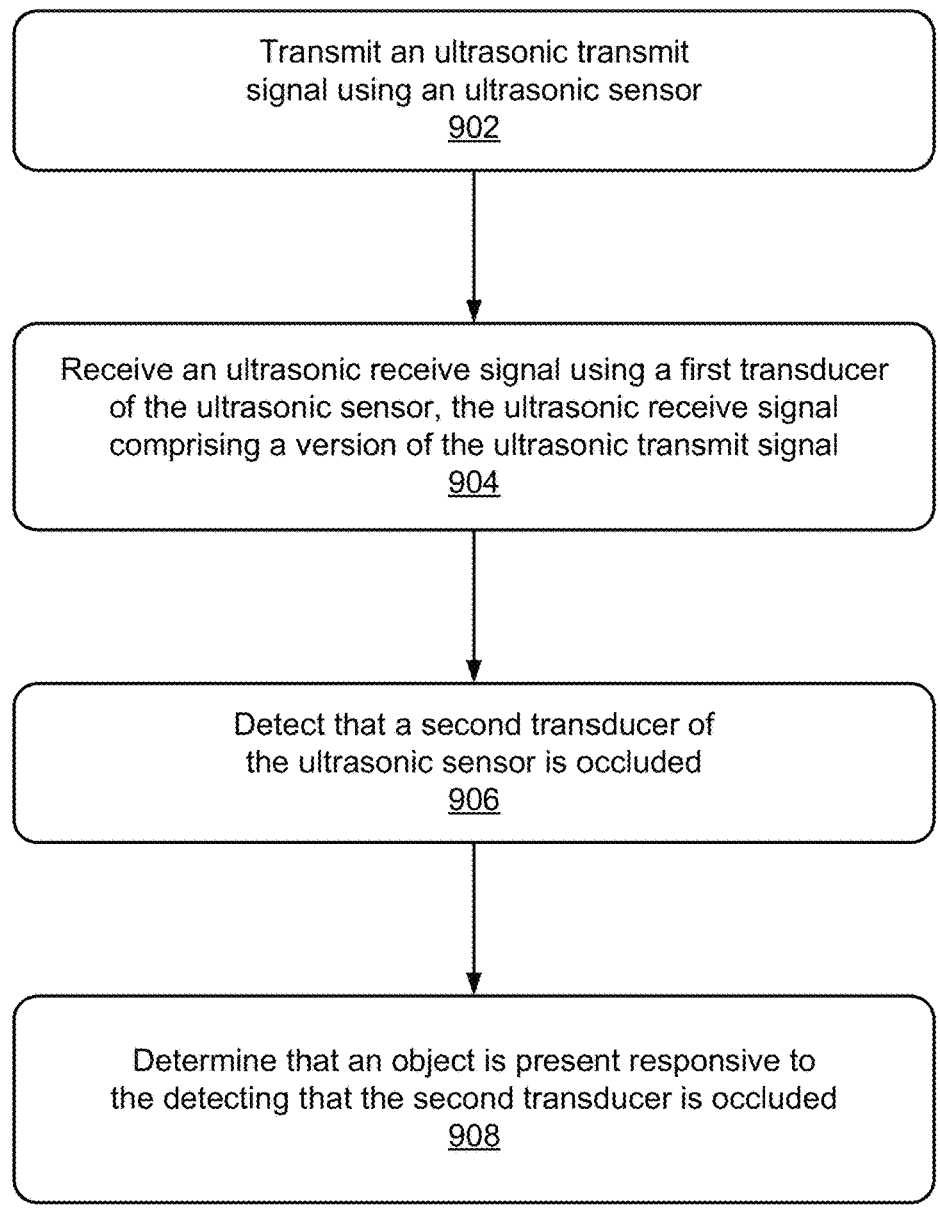
FIG. 9 illustrates an example method for detecting user presence based on microphone occlusion.

FIG. 9 depicts an example method 900 for detecting user presence based on microphone occlusion. Method 900 is shown as sets of operations (or acts) performed and is not necessarily limited to the order or combinations in which the operations are shown herein. Further, any of one or more of the operations may be repeated, combined, reorganized, or linked to provide a wide array of additional and/or alternative methods. In portions of the following discussion, reference may be made to environments 100-1 to 100-6 of FIG. 1, and entities detailed in FIG. 2 or 4, reference to which is made for example only. The techniques are not limited to performance by one entity or multiple entities operating on one computing device 104.

At 902, an ultrasonic transmit signal is transmitted using an ultrasonic sensor. For example, the ultrasonic sensor 102 transmits the ultrasonic transmit signal 414-1 or 414-S, as shown in FIG. 6. The ultrasonic transmit signal 414-1 or 414-S includes frequencies between approximately 20 kHz to 2 MHz and can represent a pulsed signal or a continuous signal. In some cases, the ultrasonic sensor 102 modulates a characteristic of the ultrasonic transmit signal 414-1 or 414-S, including the phase and/or frequency. In some implementations, the ultrasonic sensor 102 transmits the ultrasonic transmit signal 414-1 or 414-S responsive to receiving the alert signal 324 from the inertial sensor 322, as illustrated in FIG. 3-1.

The ultrasonic sensor 102 can use a dedicated transducer 212 to transmit the ultrasonic transmit signal 414-1 or 414-S. In other implementations, the ultrasonic sensor 102 can use a shared speaker (e.g., speaker 410-1 or 410-S) of the computing device 104 to transmit the ultrasonic transmit signal 414-1 or 414-S. In some situations, the shared speaker also transmits audible signals during a portion of time that the ultrasonic transmit signal 414-1 or 414-S is transmitted.

At 904, an ultrasonic receive signal using a first transducer of the ultrasonic sensor is received. The ultrasonic receive signal comprises a version of the ultrasonic transmit signal. For example, the ultrasonic sensor 102 receives the ultrasonic receive signal 416-1 using a first microphone 412-1 of FIG. 6. The ultrasonic receive signal 416-1 is a version of the ultrasonic transmit signal 414-1 (e.g., a delayed version of the ultrasonic transmit signal 414-1). In some cases, the ultrasonic receive signal 416-1 has a different amplitude than the ultrasonic transmit signal 414-1 and/or is shifted in phase and/or frequency. The ultrasonic receive signal 416-1 may or may not include a version of the ultrasonic transmit signal 414-1 that is reflected by an object (e.g., the user 305). In some implementations, the ultrasonic sensor 102 receives the ultrasonic receive signal 416-1 during at least a portion of time that the ultrasonic transmit signal 414-1 or 414-S is transmitted.

At 906, occlusion of a second transducer of the ultrasonic sensor is detected. For example, the ultrasonic sensor 102 detects that the microphone 412-M is occluded. In particular, the ultrasonic sensor 102 can analyze the ultrasonic receive signal 416-M received by the microphone 412-M to determine that a version of the ultrasonic transmit signal 414-1 is not present or an amplitude of the version of the ultrasonic transmit signal 414-1 is less than a detection threshold.

At 908, a presence of an object is determined responsive to the detecting that the second transducer is occluded. For example, the ultrasonic sensor 102 determines that an object (e.g., the user 305) is present responsive to detecting the occlusion of the microphone 412-M.

FIG. 10 depicts an example method 1000 for detecting user presence based on speaker occlusion. Method 1000 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environments 100-1 to 100-6 of FIG. 1, and entities detailed in FIG. 2 or 4, reference to which is made for example only. The techniques are not limited to performance by one entity or multiple entities operating on one computing device 104.

At 1002, a first ultrasonic transmit signal is transmitted using an ultrasonic sensor. For example, the ultrasonic sensor 102 transmits the first ultrasonic transmit signal 414-1 using a first speaker 410-1, as shown at FIG. 7.

At 1004, a second ultrasonic transmit signal is transmitted using a second transducer of the ultrasonic sensor. The first ultrasonic transmit signal and the second ultrasonic transmit signals have different waveforms. For example, the ultrasonic sensor 102 transmits the ultrasonic transmit signal 414-S using the speaker 410-S of FIG. 7. The ultrasonic transmit signals 414-1 and 414-S have different waveforms. For example, the ultrasonic transmit signals 414-1 and 414-S can have different amplitudes, phases, and/or frequencies.

The ultrasonic transmit signals 414-1 and 414-S include frequencies between approximately 20 kHz to 2 MHz. The ultrasonic transmit signals 414-1 and 414-S can also be pulsed signals or continuous signals. In some cases, the ultrasonic sensor 102 modulates a characteristic of the ultrasonic transmit signals 414-1 and 414-S, including phase and/or frequency. In some implementations, the ultrasonic sensor 102 transmits the ultrasonic transmit signal 414-1 and 414-S responsive to receiving the alert signal 324 from the inertial sensor 322, as illustrated in FIG. 3.

The ultrasonic sensor 102 can use dedicated transducers 212 to transmit the ultrasonic transmit signals 414-1 and 414-S. In other implementations, the ultrasonic sensor 102 can use shared speakers (e.g., speakers 410-1 and 410-S) of the computing device 104 to transmit the ultrasonic transmit signal 414-S. In some situations, the shared speaker also transmits audible signals during a portion of time that the ultrasonic transmit signal 414-S is transmitted.

At 1006, an ultrasonic receive signal is received by the ultrasonic sensor. The ultrasonic receive signal comprises a version of the first ultrasonic transmit signal. For example, the ultrasonic sensor 102 receives the ultrasonic receive signal 416-1 using the microphone 412-1 of FIG. 7. The ultrasonic receive signal 416-1 is a version of the ultrasonic transmit signal 414-1. In some cases, the ultrasonic receive signal 416-1 has a different amplitude than the ultrasonic transmit signal 414-1 and is shifted in phase and/or frequency. The ultrasonic receive signal 416-1 may or may not include a version of the ultrasonic transmit signal 414-1 that is reflected by an object (e.g., the user 305). In some implementations, the ultrasonic sensor 102 receives the ultrasonic receive signal 416-1 during at least a portion of time that the ultrasonic transmit signals 414-1 and 414-S are transmitted.

At 1008, occlusion of a second transducer of the ultrasonic sensor is detected. For example, the ultrasonic sensor 102 detects that the speaker 410-S is occluded. In particular, the ultrasonic sensor 102 can compare the ultrasonic transmit signal 414-S with the ultrasonic receive signal 416-M corresponding to the ultrasonic transmit signal 414-S to determine that a version of the ultrasonic transmit signal 414-S is not present or an amplitude of the version of the ultrasonic transmit signal 414-S is less than a detection threshold.

At 1010, a presence of an object is determined responsive to the detecting that the second transducer is occluded. For example, the ultrasonic sensor 102 determines that an object (e.g., the user 305) is present responsive to detecting the occlusion of the speaker 410-S.

Figure 11:
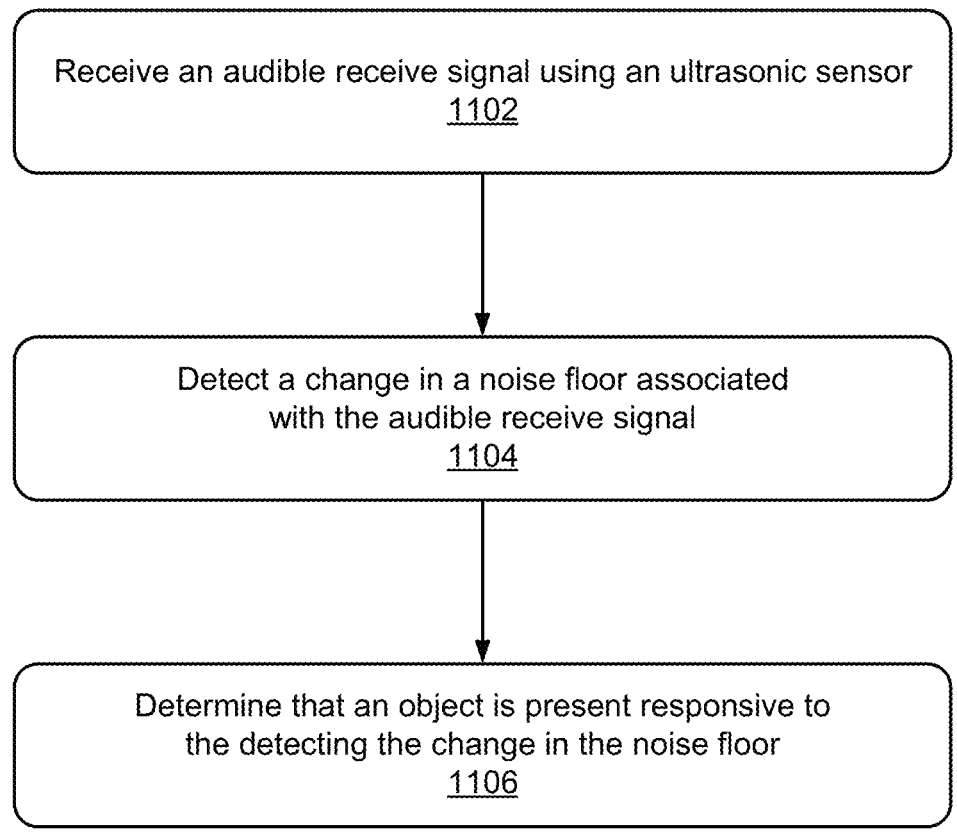
FIG. 11 illustrates an example method for detecting user presence based on a change in an audible noise floor.

FIG. 11 depicts an example method 1100 for detecting user presence based on a change in noise floor. Method 1100 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environments 100-1 to 100-6 of FIG. 1, and entities detailed in FIG. 2 or 4, reference to which is made for example only. The techniques are not limited to performance by one entity or multiple entities operating on one computing device 104.

At 1102, an audible receive signal is received using an ultrasonic sensor. For example, the ultrasonic sensor 102 receives the audible receive signal 804 using microphone 412-M, as shown in FIG. 8. The audible receive signal 804 includes frequencies in an audible range between approximately 20 Hz and 20 kHz. The audible receive signal 804 can include noise (e.g., internal, electrical, external). The noise has an audible noise floor 802, which represents a maximum or average amplitude of the noise. In addition to being capable of receiving an audible receive signal 804, the ultrasonic sensor 102 may also be capable of receiving an ultrasonic receive signal (e.g., a signal in a frequency range between approximately 20 kHz to 2 MHz). In this manner, an ultrasonic sensor 102 may be able to perform the methods 900 and/or 1000, as well as method 1100. Alternatively or additionally, the ultrasonic sensor 102 may be able to detect a change in both the ultrasonic noise floor and the audible noise floor.

At 1104, a change in an audible noise floor associated with the audible receive signal is detected. For example, the ultrasonic sensor 102 of FIG. 8 detects a noise floor change 808 in the audible receive signal 804. The noise floor change 808 may include a change in amplitude, frequency, or phase of the audible noise floor 802.

At 1106, a presence of an object is determined responsive to the detecting the change in noise floor. For example, the ultrasonic sensor 102 determines that an object (e.g., the user 305) is present responsive to detecting the noise floor change 808 of the audible receive signal 804 received by the microphone 412-M. User presence may occlude a portion of a transducer 212 and/or include an abrasive motion of a hand or finger of the user across or next to the transducer 212 of the ultrasonic sensor 102. For example, in FIG. 8, the user 305 rubs their finger across microphone 412-M, which causes an abrasive motion. This abrasive motion changes the audible noise floor 802 associated with the audible receive signal 804.

Although not explicitly shown in methods 900, 1000, or 1100, the ultrasonic sensor 102 can perform additional operations responsive to determining that the object is present. For example, the ultrasonic sensor 102 can notify the user 305 using the ultrasonic sensor application 206 or control an operational state of the component 224, as described in FIGS. 2, 3-2, and 3-3. Also, the ultrasonic sensor 102 can combine different operations across methods 900, 1000, and 1100 together. For example, the ultrasonic sensor 102 can determine that the user 305 is present responsive to detecting two or more of the following: microphone occlusion, speaker occlusion, or a change in an audible noise floor 802.

Example Computing System

Figure 12:
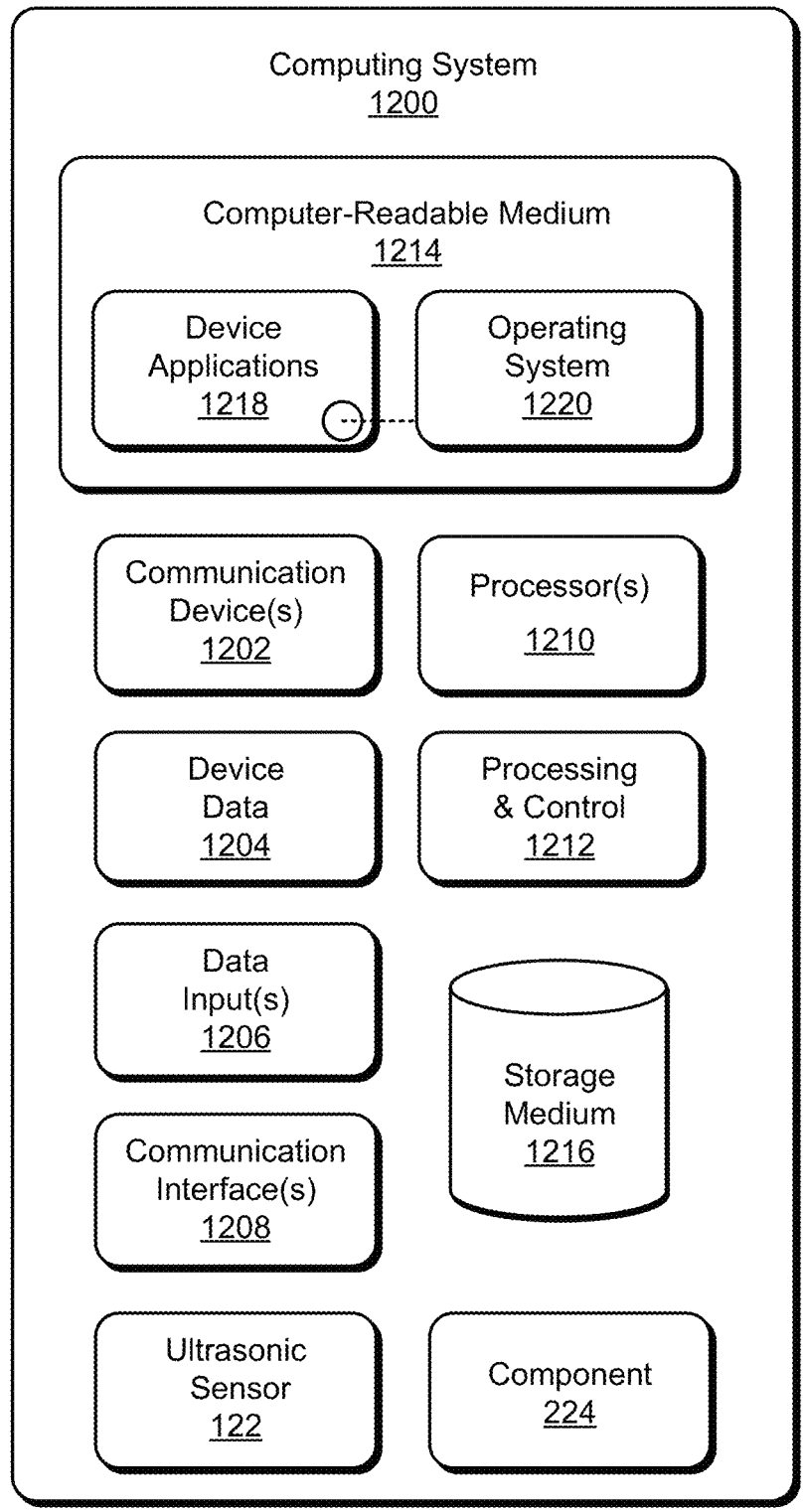
FIG. 12 illustrates an example computing system embodying, or in which techniques may be implemented that enable use of, an ultrasonic sensor capable of detecting user presence.

FIG. 12 illustrates various components of an example computing system 1200 that can be implemented as any type of client, server, and/or computing device as described with reference to the previous FIG. 2 to detect user presence using an ultrasonic sensor 102.

The computing system 1200 includes communication devices 1202 that enable wired and/or wireless communication of device data 1204 (e.g., received data, data that is being received, data scheduled for broadcast, or data packets of the data). Although not shown, the communication devices 1202 or the computing system 1200 can include one or more ultrasonic sensors 102 and one or more components 224. The device data 1204 or other device content can include configuration settings of the device, media content stored on the device, and/or information associated with a user 305 of the device. Media content stored on the computing system 1200 can include any type of audio, video, and/or image data. The computing system 1200 includes one or more data inputs 1206 via which any type of data, media content, and/or inputs can be received, including human utterances, inputs from the ultrasonic sensor 102, user-selectable inputs (explicit or implicit), messages, music, television media content, recorded video content, and any other type of audio, video, and/or image data received from any content and/or data source.

The computing system 1200 also includes communication interfaces 1208, which can be implemented as any one or more of a serial and/or parallel interface, a wireless interface, any type of network interface, a modem, and as any other type of communication interface. The communication interfaces 1208 provide a connection and/or communication links between the computing system 1200 and a communication network by which other electronic, computing, and communication devices communicate data with the computing system 1200.

The computing system 1200 includes one or more processors 1210 (e.g., any of microprocessors, controllers, and the like), which process various computer-executable instructions to control the operation of the computing system 1200 and to enable techniques for, or in which can be embodied, detection of the user 305. Alternatively or in addition, the computing system 1200 can be implemented with any one or combination of hardware, firmware, or fixed logic circuitry that is implemented in connection with processing and control circuits, which are generally identified at 1212. Although not shown, the computing system 1200 can include a system bus or data transfer system that couples the various components within the device. A system bus can include any one or combination of different bus structures, including a memory bus or memory controller, a peripheral bus, a universal serial bus, and/or a processor or local bus that utilizes any of a variety of bus architectures.

The computing system 1200 also includes a computer-readable media 1214, including one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, including a hard disk drive, a recordable and/or rewriteable compact disc (CD), any type of a digital versatile disc (DVD), and the like. The computing system 1200 can also include a mass storage media device (storage media) 1216.

The computer-readable media 1214 provides data storage mechanisms to store the device data 1204, as well as various device applications 1218 and any other types of information and/or data related to operational aspects of the computing system 1200. For example, an operating system 1220 can be maintained as a computer application with the computer-readable media 1214 and executed on the processors 1210. The device applications 1218 may include a device manager, including any form of a control application, software application, signal-processing and control module, code that is native to a particular device, a hardware abstraction layer for a particular device, and so on. Using the ultrasonic sensor 102, the computing system 1200 can detect user presence.

CONCLUSION

Although techniques using, and apparatuses including, detecting user presence have been described in language specific to features and/or methods, it is to be understood that the subject of the appended claims is not necessarily limited to the specific features or methods described. Rather, the specific features and methods are disclosed as example implementations of an ultrasonic sensor capable of detecting user presence.

Some Examples are described below.

Example 1: A method of operating an ultrasonic sensor, the method comprising:
  transmitting an ultrasonic transmit signal;
  receiving an ultrasonic receive signal using a first transducer of the ultrasonic sensor, the ultrasonic receive signal comprising a version of the ultrasonic transmit signal;
  detecting that a second transducer of the ultrasonic sensor is occluded; and
  determining that an object is present responsive to the detecting that the second transducer is occluded.

Example 2: The method of example 1, wherein the detecting that the second transducer is occluded comprises:
  receiving another receive signal using the second transducer; and
  analyzing the other receive signal to determine that:
    a version of the ultrasonic transmit signal is not present within the other receive signal; or
    an amplitude of the version of the ultrasonic transmit signal is less than a detection threshold.

Example 3: The method of example 2, wherein the detecting that the second transducer is occluded further comprises detecting a change in a noise floor across at least a portion of audible frequencies of the other receive signal.

Example 4: The method of any preceding example, further comprising: transmitting another ultrasonic transmit signal;
  receiving another ultrasonic receive signal using the second transducer, the other ultrasonic receive signal comprising a version of the other ultrasonic transmit signal;
  detecting that the first transducer is occluded; and
  determining that another object is present based on the detecting that the first transducer is occluded.

Example 5: The method of any preceding example, wherein:
  the ultrasonic sensor is integrated within a smartphone;
  the first transducer comprises a first microphone of the smartphone; and
  the second transducer comprises a second microphone of the smartphone.

Example 6: The method of example 5, wherein:
  the first microphone is positioned a distance from the second microphone; and
  the distance is at least five centimeters.

Example 7: The method of example 5 or 6, further comprising notifying a user of the smartphone of the occlusion responsive to the detecting that the second transducer is occluded.

Example 8: The method of any preceding example, further comprising triggering a component to transition from a first operational state to a second operational state responsive to determining that the object is present,
  wherein the component is distinct from the ultrasonic sensor.

Example 9: The method of example 8, wherein the second transducer is proximate to the component.

Example 10: The method of example 8 or 9, wherein the component comprises an optical sensor.

Example 11: The method of example 10, wherein the triggering of the optical sensor to transition from the first operational state to the second operational state comprises triggering the optical sensor to transition from an inactive state to an active state that emits visible light.

Example 12: The method of any preceding example, wherein the receiving of the ultrasonic receive signal comprises receiving a portion of the ultrasonic receive signal while a portion of the ultrasonic transmit signal is transmitted.

Example 13: The method of any preceding example, further comprising:
  prior to transmitting the ultrasonic transmit signal, operating in an inactive state;
  receiving an alert signal from an inertial sensor; and
  transitioning from the inactive state to an active state responsive to receiving the alert signal.

Example 14: A method of operating an ultrasonic sensor, the method comprising:
  transmitting a first ultrasonic transmit signal using a first transducer of the ultrasonic sensor;
  transmitting a second ultrasonic transmit signal using a second transducer of the ultrasonic sensor, the first ultrasonic transmit signal and the second ultrasonic transmit signal having different waveforms;
  receiving an ultrasonic receive signal, the ultrasonic receive signal comprising a version of the first ultrasonic transmit signal;
  detecting that the second transducer is occluded; and
  determining that an object is present responsive to the detecting that the second transducer is occluded.

Example 15: The method of example 14, wherein the determining that the second transducer is occluded comprises analyzing the ultrasonic receive signal to determine that:
  a version of the second ultrasonic transmit signal is not present within the ultrasonic receive signal; or
  an amplitude of the version of the second ultrasonic transmit signal is less than a detection threshold.

Example 16: The method of examples 14 or 15, wherein the different waveforms of the first ultrasonic transmit signal and the second ultrasonic transmit signal have at least one of the following:
  different frequencies;
  different phases; or
  different amplitudes.

Example 17: The method of any one of examples 14-16, further comprising:
  transmitting a third ultrasonic transmit signal using the first transducer;
  transmitting a fourth ultrasonic transmit signal using the second transducer, the third ultrasonic transmit signal and the fourth ultrasonic transmit signal having different waveforms;
  receiving another ultrasonic receive signal, the other ultrasonic receive signal comprising a version of the fourth ultrasonic transmit signal;
  detecting that the first transducer is occluded; and
  determining that another object is present responsive to the detecting that the first transducer is occluded.

Example 18: The method of any one of examples 14-17, wherein:
  the ultrasonic sensor is integrated within a smartphone;
  the first transducer comprises a first speaker of the smartphone; and
  the second transducer comprises a second speaker of the smartphone.

Example 19: The method of example 18, wherein:
  the smartphone has a first portion and a second portion defined by a plane that is perpendicular to a longest edge of the smartphone and passes through a middle of the smartphone;

the first speaker is positioned within the first portion; and
the second speaker is positioned within the second portion.

Example 20: The method of example 18 or 19, further comprising notifying a user of the smartphone of the occlusion responsive to the detecting that the second speaker is occluded.

Example 21: The method of any one of examples 14-20, further comprising triggering a component to transition from a first operational state to a second operational state responsive to determining that the object is present,
wherein the component is distinct from the ultrasonic sensor.

Example 22: The method of example 21, wherein the second transducer is proximate to the component.

Example 23: The method of example 21 or 22, wherein the component comprises an optical sensor.

Example 24: The method of example 23, wherein the triggering of the optical sensor to transition from the first operational state to the second operational state comprises triggering the optical sensor to transition from an inactive state to an active state that emits visible light.

Example 25: A method of operating an ultrasonic sensor, the method comprising:
receiving an audible receive signal;
detecting a change in a noise floor associated with the audible receive signal; and
determining that an object is present responsive to the detecting the change in the noise floor.

Example 26: The method of example 25, wherein the detecting the change in the noise floor comprises detecting a change in an amplitude of the noise floor across at least a portion of audible frequencies associated with the audible receive signal.

Example 27: The method of example 25 or 26, wherein the audible receive signal is associated with an abrasive motion proximate to a transducer of the ultrasonic sensor.

Example 28: The method of example 27, wherein the abrasive motion is caused by a portion of a user rubbing next to or across the transducer.

Example 29: The method of example 28, wherein:
the ultrasonic sensor is integrated within a smartphone; and
the transducer comprises a microphone of the smartphone.

Example 30: An apparatus comprising an ultrasonic sensor configured to perform any of the methods of claims 1-29.

Example 31: The apparatus of example 30, wherein the apparatus comprises one of the following:
a smartphone;
a smart watch;
a smart speaker;
a desktop computer;
a laptop computer;
a smart tablet;
a security camera;
a vehicle; or
a household appliance.

Example 32: The apparatus of example 30 or 31, wherein:
the apparatus comprises a component distinct from the ultrasonic sensor; and
the component comprises one of the following:
an optical sensor;
a proximity sensor;
a location sensor;
a camera;
a health sensor;
an accelerometer;
a barometer; or
an inertial motion sensor.

Example 33: The apparatus of example 32, wherein:
the component comprises the optical sensor;
the optical sensor is selectively configured to operate in an inactive state or an active state; and
the optical sensor is configured to emit visible light in the active state.

Example 34: A method of operating an ultrasonic sensor comprising performing, in any combination:
the method of any of examples 1 to 13; and/or
the method of any of examples 14 to 24; and/or
the method of any of examples 25 to 29.

Example 35: A computer-readable medium comprising instructions which, when executed by a processor, cause an apparatus comprising the processor and an ultrasonic sensor to perform the method of any of examples 1 to 29 or 34.

What is claimed is:

1. A method of operating an ultrasonic sensor, the method comprising:
receiving an ultrasonic receive signal using a first transducer of the ultrasonic sensor, the ultrasonic receive signal comprising a version of an ultrasonic transmit signal;
detecting that a second transducer of the ultrasonic sensor is occluded, the detecting that the second transducer is occluded comprising:
failing to receive, by the second transducer, a second ultrasonic receive signal that includes a version of the ultrasonic transmit signal; or
determining, in response to receiving the second ultrasonic receive signal by the second transducer, that an amplitude of a version of the ultrasonic transmit signal in the second ultrasonic receive signal is less than a threshold; and
determining, responsive to the reception of the ultrasonic receive signal using the first transducer and the detection that the second transducer of the ultrasonic sensor is occluded, that an object is present.

2. The method of claim 1, wherein the detecting that the second transducer is occluded further comprises detecting a change in a noise floor across at least a portion of audible frequencies of the other receive signal.

3. The method of claim 1, further comprising:
transmitting another ultrasonic transmit signal;
receiving another ultrasonic receive signal using the second transducer, the other ultrasonic receive signal comprising a version of the other ultrasonic transmit signal;
detecting that the first transducer is occluded; and
determining that another object is present based on the detecting that the first transducer is occluded.

4. The method of claim 1, wherein:
the ultrasonic sensor is integrated within a smartphone;
the first transducer comprises a first microphone of the smartphone; and
the second transducer comprises a second microphone of the smartphone.

5. The method of claim 4, wherein:
the first microphone is positioned a distance from the second microphone; and
the distance is at least five centimeters.

6. The method of claim 4, further comprising notifying a user of the smartphone of the occlusion responsive to the detecting that the second transducer is occluded.

7. The method of claim 1, further comprising triggering a component to transition from a first operational state to a second operational state responsive to determining that the object is present, wherein the component is distinct from the ultrasonic sensor.

8. The method of claim 7, wherein the second transducer is proximate to the component.

9. The method of claim 7, wherein the component comprises an optical sensor.

10. The method of claim 9, wherein the triggering of the optical sensor to transition from the first operational state to the second operational state comprises triggering the optical sensor to transition from an inactive state to an active state that emits visible light.

11. The method of claim 1, wherein the receiving of the ultrasonic receive signal comprises receiving a portion of the ultrasonic receive signal while a portion of the ultrasonic transmit signal is transmitted.

12. The method of claim 1, further comprising:
prior to transmitting the ultrasonic transmit signal, operating in an inactive state;
receiving an alert signal from an inertial sensor; and
transitioning from the inactive state to an active state responsive to receiving the alert signal, the active state enabling the ultrasonic sensor to transmit or receive ultrasonic signals.

13. An apparatus comprising:
an ultrasonic sensor;
at least one processor; and
at least one computer-readable storage media storing one or more instructions that, when executed by the at least one processor, cause the at least one processor to:
receive, using a first transducer of the ultrasonic sensor, an ultrasonic receive signal comprising a version of an ultrasonic transmit signal;
detect that a second transducer of the ultrasonic sensor is occluded, the detection that the second transducer is occluded comprises:
fail to receive, by the second transducer, a second ultrasonic receive signal that includes a version of the ultrasonic transmit signal; or
determine, in response to a receipt of the second ultrasonic receive signal by the second transducer, that an amplitude of a version of the ultrasonic transmit signal in the second ultrasonic receive signal is less than a threshold; and
determine, responsive to the reception of the ultrasonic receive signal using the first transducer and the detection that the second transducer is occluded, that an object is present.

14. The apparatus of claim 13, wherein the apparatus comprises one of the following:
a smartphone;
a smart watch;
a smart speaker;
a desktop computer;
a laptop computer;
a smart tablet;
a security camera;
a vehicle; or
a household appliance.

15. The apparatus of claim 13, wherein:
the apparatus comprises a component distinct from the ultrasonic sensor; and
the component comprises one of the following:
an optical sensor;
a proximity sensor;
a location sensor;
a camera;
a health sensor;
an accelerometer;
a barometer; or
an inertial motion sensor.

16. The apparatus of claim 15, wherein:
the component comprises the optical sensor;
the optical sensor is selectively configured to operate in an inactive state where the optical sensor does not emit visible light or an active state where the optical sensor does emit visible light; and
the execution of the one or more instructions further causes the at least one processor to:
transition, responsive to determining that the object is present, the optical sensor from the inactive state to the active state.

17. The apparatus of claim 13, wherein the execution of the one or more instructions for detecting that the second transducer is occluded causes the at least one processor to:
detecting a change in a noise floor across at least a portion of audible frequencies of the other receive signal.

18. The apparatus of claim 13, wherein the execution of the one or more instructions further cause the at least one processor to:
operate, prior to transmission of the ultrasonic transmit signal, the ultrasonic sensor in an inactive state;
receive an alert signal from an inertial sensor; and
transition, responsive to reception of the alert signal, the ultrasonic sensor from the inactive state to an active state where the ultrasonic sensor is enabled to transmit or receive ultrasonic signals.

19. The apparatus of claim 13, wherein the execution of the one or more instructions further cause the at least one processor to:
transmit another ultrasonic transmit signal;
receive another ultrasonic receive signal using the second transducer, the other ultrasonic receive signal comprising a version of the other ultrasonic transmit signal;
detect that the first transducer is occluded; and
determine that another object is present based on the detection that the first transducer is occluded.

20. The apparatus of claim 13, wherein the execution of the one or more instructions further cause the at least one processor to:
notify a user of the apparatus of the occlusion responsive to the detection that the second transducer is occluded.

* * * * *